United States Patent
Evans et al.

(10) Patent No.: US 10,216,396 B2
(45) Date of Patent: Feb. 26, 2019

(54) TECHNIQUES FOR CONTROLLING A PORTABLE WELDING SYSTEM

(71) Applicant: The ESAB Group, Inc., Florence, SC (US)

(72) Inventors: Daryll Scott Evans, Winchester, VA (US); Mark Lowther, Warrington (GB); Cristiano Magalhães Campos Ferreira, Belo Horizonte (BR); Lee Roy Mantell, Essex, MD (US); Xia Chen, Clarksville, MD (US)

(73) Assignee: The ESAB Group, Inc., Florence, SC (US)

( * ) Notice: Subject to any disclaimer, the term of this patent is extended or adjusted under 35 U.S.C. 154(b) by 231 days.

(21) Appl. No.: 14/933,227

(22) Filed: Nov. 5, 2015

(65) Prior Publication Data

US 2016/0132227 A1    May 12, 2016

Related U.S. Application Data

(60) Provisional application No. 62/076,764, filed on Nov. 7, 2014.

(51) Int. Cl.
*G06F 3/048* (2013.01)
*G06F 3/0484* (2013.01)
(Continued)

(52) U.S. Cl.
CPC ........ *G06F 3/04847* (2013.01); *B23K 9/0953* (2013.01); *B23K 9/10* (2013.01); *B23K 9/1062* (2013.01)

(58) Field of Classification Search
CPC ..... G06F 3/04847; B23K 9/0953; B23K 9/10; B23K 9/1062
(Continued)

(56) References Cited

U.S. PATENT DOCUMENTS 9,589,481 B2 *  3/2017  Becker ................. G09B 19/24
9,666,100 B2 *  5/2017  Becker ................. G09B 19/24
(Continued)

FOREIGN PATENT DOCUMENTS

WO    2013/138831 A1    9/2013

OTHER PUBLICATIONS

US 9,728,104, 08/2017, Boulware (withdrawn)*
(Continued)

*Primary Examiner* — David Phantana-angkool
(74) *Attorney, Agent, or Firm* — Edell, Shapiro & Finnan, LLC

(57) ABSTRACT

A system, computer-implemented method, and article for controlling a user interface of a portable welding system are described. An input signal receiver, operable on a processor, is configured to receive one or more input signals from one or more input devices. A display controller, operable on the processor, is configured to receive, input information based upon the one or more input signals. A display device is configured to display a user interface provided by the display controller, the user interface including a first portion including an adjustable value and a second portion including a non-adjustable value. The display controller is configured to highlight changes to the non-adjustable value based upon changes made using the one or more input devices to the adjustable value.

18 Claims, 45 Drawing Sheets

(51) Int. Cl.
  *B23K 9/095* (2006.01)
  *B23K 9/10* (2006.01)
(58) Field of Classification Search
  USPC .......................................................... 715/771
  See application file for complete search history.

(56) References Cited

U.S. PATENT DOCUMENTS

| | | | | |
|---|---|---|---|---|
| 9,672,757 | B2* | 6/2017 | Becker | G09B 19/24 |
| 9,685,099 | B2* | 6/2017 | Boulware | G09B 19/24 |
| 9,691,299 | B2* | 6/2017 | Peters | G09B 19/24 |
| 9,713,852 | B2* | 7/2017 | Becker | B23K 9/0956 |
| 9,724,787 | B2* | 8/2017 | Becker | B23K 37/00 |
| 9,724,788 | B2* | 8/2017 | Becker | B23K 37/006 |
| 9,728,103 | B2* | 8/2017 | Becker | G09B 19/24 |
| 9,836,994 | B2* | 12/2017 | Kindig | G09B 19/24 |
| 9,836,995 | B2* | 12/2017 | Zboray | G09B 19/24 |
| 9,858,833 | B2* | 1/2018 | Zboray | G09B 19/24 |
| 9,875,665 | B2* | 1/2018 | Beeson | B23K 9/0956 |
| 9,928,755 | B2* | 3/2018 | Wallace | G09B 5/00 |
| 9,937,578 | B2* | 4/2018 | Becker | B23K 9/0956 |
| 9,993,891 | B2* | 6/2018 | Wiryadinata | B23K 9/0956 |
| 2009/0152251 | A1* | 6/2009 | Dantinne | B23K 9/1062 |
| | | | | 219/125.1 |
| 2014/0272836 | A1* | 9/2014 | Becker | G09B 19/24 |
| | | | | 434/234 |

OTHER PUBLICATIONS

European Search Report dated Apr. 15, 2016 for European Patent Application No. 15190301.0 filed Oct. 16, 2015.
Communication pursuant to Article 94(3) EPC for European application 15190301.0-1016, dated Jun. 21, 2018, 4 pages.
"TPS/i Fronius (Intelligent Revolution)", youtube, Sep. 27, 2013 (Sep. 27, 2013), 4 pp.,XP054978409, Retrieved from the Internet: URL: https://www.youtube.com/watch?v=GIvR-viKLOs [retrieved on Jun. 11, 2018].

* cited by examiner

TECHNIQUES FOR CONTROLLING A PORTABLE WELDING SYSTEM

CROSS-REFERENCE TO RELATED APPLICATIONS

This application claims priority to U.S. provisional patent application Ser. No. 62/076,764, filed Nov. 7, 2014, the entire contents of which is incorporated by reference herein.

FIELD OF THE DISCLOSURE

The disclosure generally relates to welding equipment, and more particularly to improved techniques for controlling a portable welding system with a user interface.

BACKGROUND OF THE DISCLOSURE

Portable welding systems are known, and often incorporate a welding power supply and related mechanisms (e.g., wire feeder, wire spool) in a portable case. Such portable welding systems find use in applications where it is not practical or convenient to send a work-piece to a shop for repair or fabrication. Examples of applications for such portable welding systems include petroleum and chemical fabrication, shipboard installation and repair, and the like. As such, known portable welding systems may be relatively light weight to enable a user to lift and carry the system to the work site. Because of the portability and flexibility of these welding systems they have found wide-spread use and popularity.

One issue with portable welders is that existing user interfaces can be unintuitive, especially to novice users, which may lead to decreased safety during operation. Unintuitive user interfaces may also lead to errors when entering settings into a portable welder. Further, existing user interfaces may offer limited functionality to users.

SUMMARY OF THE DISCLOSURE

A user interface for a portable welding system casing is disclosed. A system, computer-implemented method, and article for controlling a user interface of a portable welding system are described. An input signal receiver, operable on a processor, may be configured to receive one or more input signals from one or more input devices. A display controller, operable on the processor, may be configured to receive, input information based upon the one or more input signals. A display device may be configured to display a user interface provided by the display controller, the user interface including a first portion including an adjustable value and a second portion including a non-adjustable value. The display controller may be configured to highlight changes to the non-adjustable value based upon changes made using the one or more input devices to the adjustable value.

BRIEF DESCRIPTION OF THE DRAWINGS

By way of example, embodiments of the disclosed systems and methods will now be described, with reference to the accompanying drawings, in which.

DETAILED DESCRIPTION

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Figure 1:
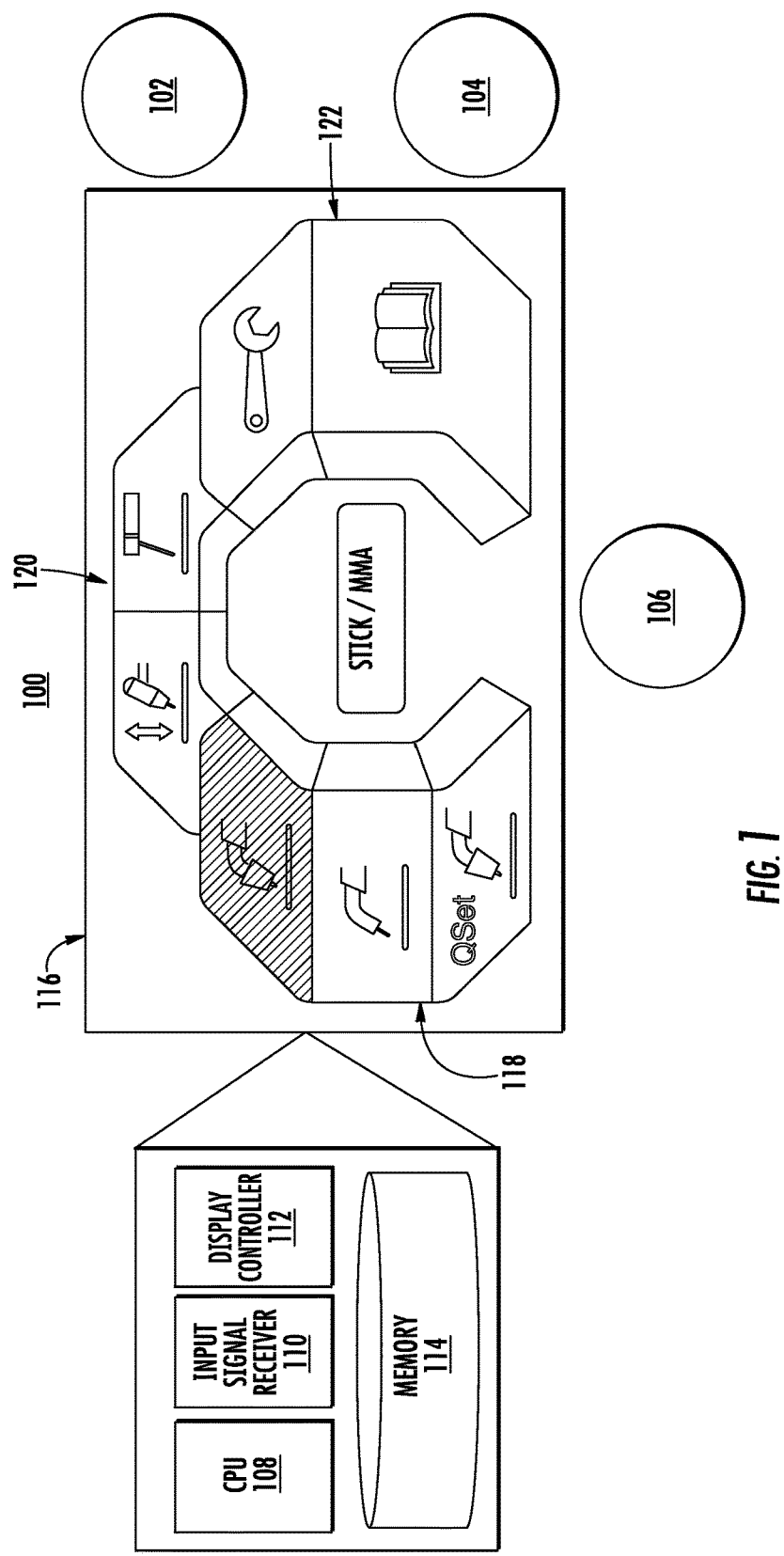
FIGS. 1-41 illustrate various exemplary user interfaces for a welding system.
Figure 2:
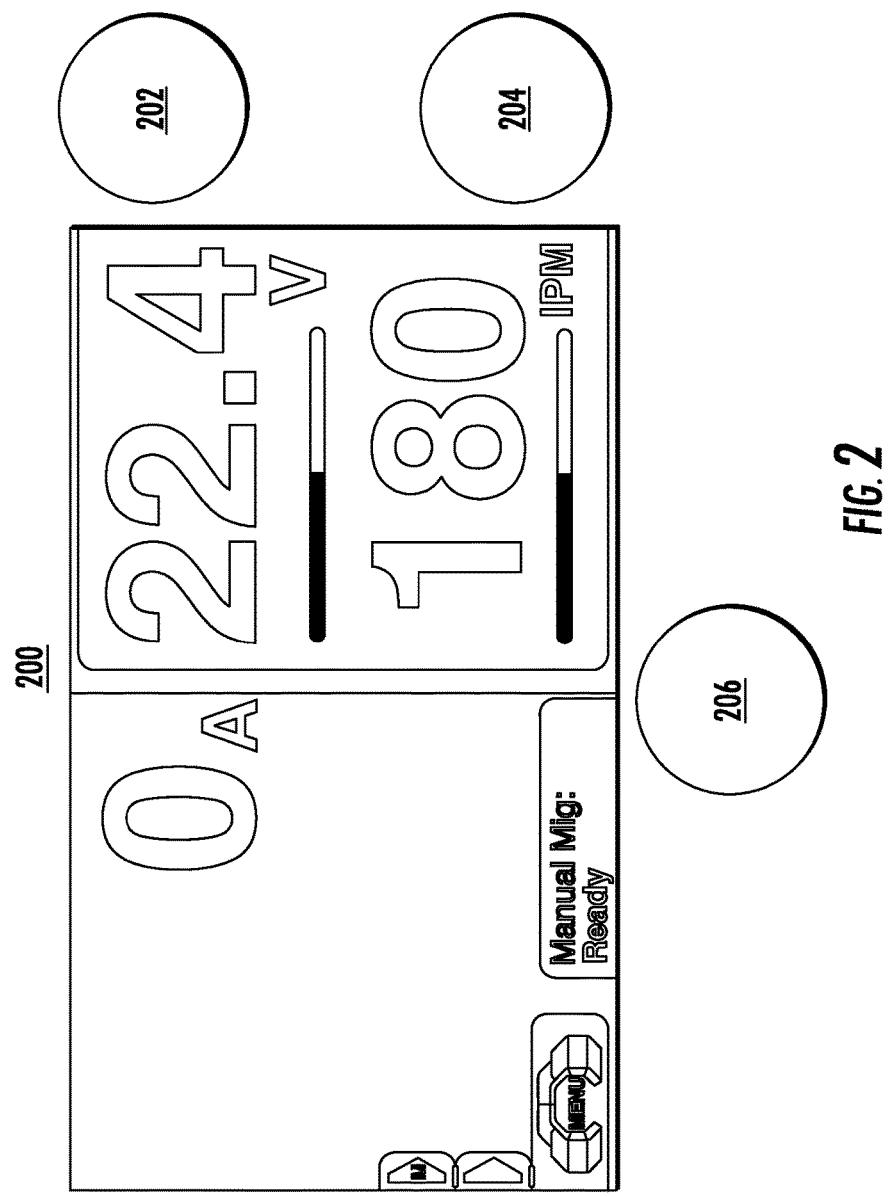

FIGS. 1-41 illustrates various embodiments of a user interface for a welding system. While reference will be made to a portable welding system throughout the disclosure, it will be appreciated that the user interfaces described herein may be also be used on non-portable welding systems, or other welding equipment. Referring to FIG. 1, an embodiment of a user interface 100 for a portable welding system is shown. User interface 100 may be presented on display 116 and be integrated into the casing of a portable welding system, or in some instances, may be available as an external component used in conjunction with a portable welding system. User interface 100 may be generated using a combination of CPU 108, an input signal receiver 110 (e.g., a module), a display controller 112 (e.g., an input module), and memory 114. Examples of CPU 108, memory 114, and display 116 are described in more detail below with respect to FIGS. 44 and 45. While a limited number of components are illustrated within FIG. 1 for purposes of explanation, it will be appreciated that more or less components may be used.

User interface 100 may be generated using a combination of modules, each of which may use software and/or hardware to accept user input and display output on user interface 100. Input signal receiver 110 may be connected to one or more input devices, such as knobs 102, 104, and 106, which may be operated by a user of a portable welding system. Knobs 102, 104, and 106 may be rotary knobs that may be turned to navigate user interface 100. During navigation, various user interface elements may be highlighted by turning knobs 102, 104, and 106. Each of knobs 102, 104, and 106 may include, or be connected to, a button, which may be pressed by a user. Pressing a button may be used to select highlighted user interface elements, for example. It will be appreciated that more or less knobs may be used based upon a given implementation, and knobs may be replaced with other input devices, such as those described below. For example, touch screen elements may be used to replicate the look and feel of physical knobs and buttons, or any combination of physical and/or soft buttons may be used to navigate user interface 100.

User inputs to knobs 102, 104, and/or 106, whether rotation or pressing, may be communicated to input signal receiver 110. Input signal receiver 110, in turn, may translate or forward input signals to a display controller 112, (hereinafter display controller 112), which may be configured through software and/or hardware to control display 116. Thus, in response to inputs received by input signal receiver 110, display controller 112 may modify the user interface displayed to the user. Display controller 112 may retrieve graphics, text, or other information from memory 114 in response to communications from input signal receiver 110. For example, when a new mode is selected by a user, display controller 112 may retrieve icons, text, and color schemes from memory 114 for presentation on display 116.

As illustrated within FIG. 1, user interface 100 includes a number of selectable on-screen user interface elements. The user interface elements are organized into sections, each section associated with a color, shape, feature, or other distinguishing visual element. For example, left section 118, which may be associated with blue, includes three user interface elements, top section 120, which may be associated with orange, includes two user interface elements, and right section 122, which may be associated with green, includes two user interface elements. It will be appreciated that more or less total user interface elements may be used, and each section may include more or less user interface elements based upon various designs and implementations.

Each colored section of user interface 100 may be associated with a category of welding processes or functionality of a portable welding system. In one non-limiting example, left section 118, which may be associated with blue, may be associated with metal inert gas (MIG) variants, top section 120, which may be associated with orange, may be associated with tungsten inert gas (TIG) and/or manual metal arc (MMA) (hot electrode) processes, and right section 122, which may be associated with green, may be associated with settings and other informational documentation, such as help guides, suggested settings, warranty information, or product manuals.

As shown, the top-most user interface element of left section 118 has been highlighted in response to user input to one of knobs 102, 104, and/or 106. For example, a user may have turned knob 106 to highlight the top-most user interface element of left section 118, and may select the highlighted user interface element by pressing knob 106.

FIGS. 2-41 illustrate additional user interfaces that may be used in conjunction with CPU 108, input signal receiver 110, display controller 112, memory 114, and display 115. In each of FIGS. 2-41, knobs 102, 104, and 106 are illustrated and numbered in a manner consistent with FIG. 1. As discussed above, it will be appreciate that more or less knobs may be used based upon a given implementation, and knobs may be replaced with other input devices, such as those described below.

FIGS. 2-13 illustrate exemplary user interfaces for a manual MIG mode of a portable welding system. Modes may be displayed in a color scheme consistent with a section from which the mode was chosen. For example, left section 118 may be colored blue, thus, modes entered via left section 118 may have a color scheme that is blue as well. In this manner, a current operation mode of a portable welding system is readily apparent to users of the system.

Figure 3:
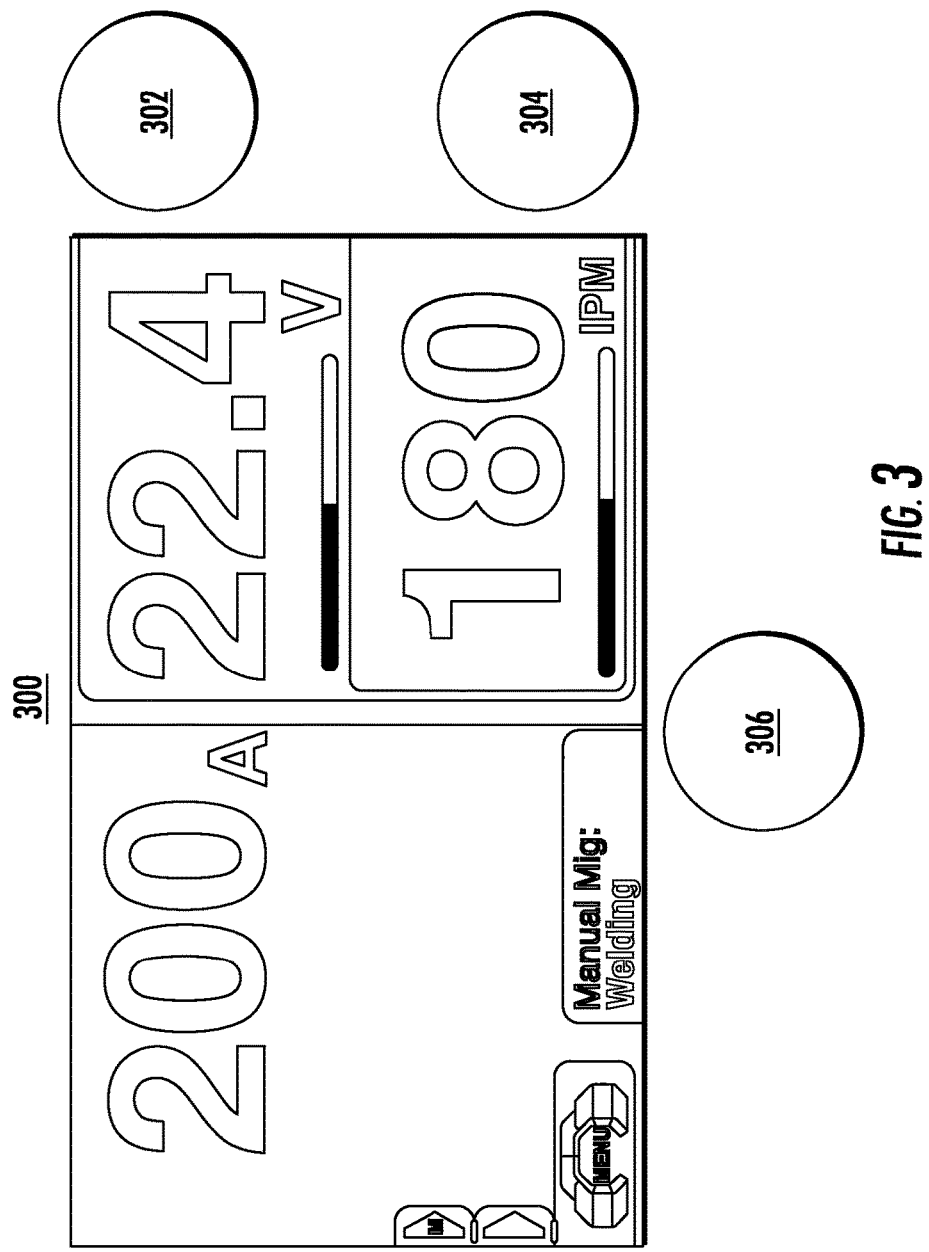

As shown in FIG. 3, a diminished contrast value for a user interface element may indicate that the user interface element is not adjustable. For example, the amperage value "200A" is displayed within user interface 300 with diminished contrast, which indicates that the value cannot be adjusted by the user. Values, such as the amperage value, may not be directly adjustable, but may be derived from other adjustable values, as discussed below.

Adjustable values may be shown with increased contrast and may include additional user interface elements to indicate adjustability. For example, the voltage value "22.4V" and inches per minute (IPM) value "180IPM" are displayed with high contrast colors (black text on white background) and include a slider bar below each number, indicating that the value may be adjusted and the relative range of adjustment available. In some embodiments, these adjustable values may be displayed in higher contrast during active welding than during rest. For example, user interface 200 may display the adjustable values with a gray background during rest and user interface 300 may display the adjustable values with a white background during active welding.

Figure 4:
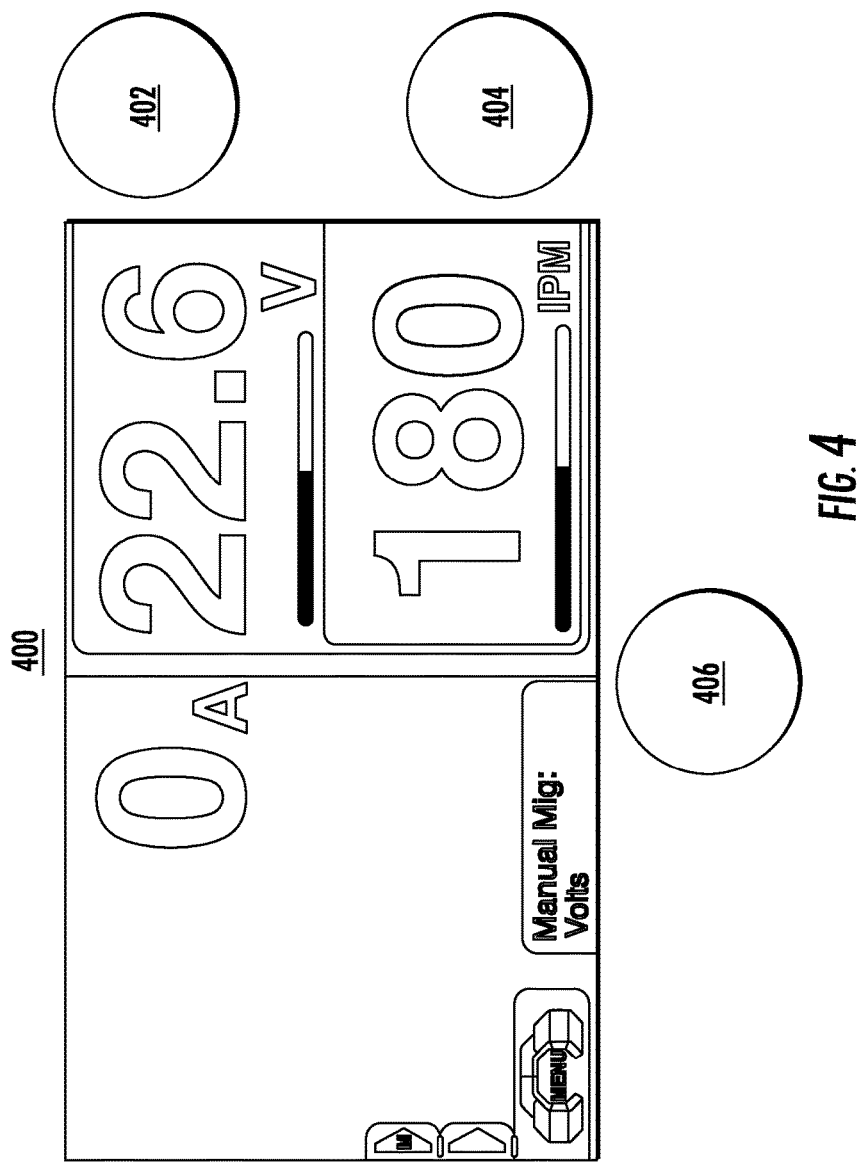
Figure 5:
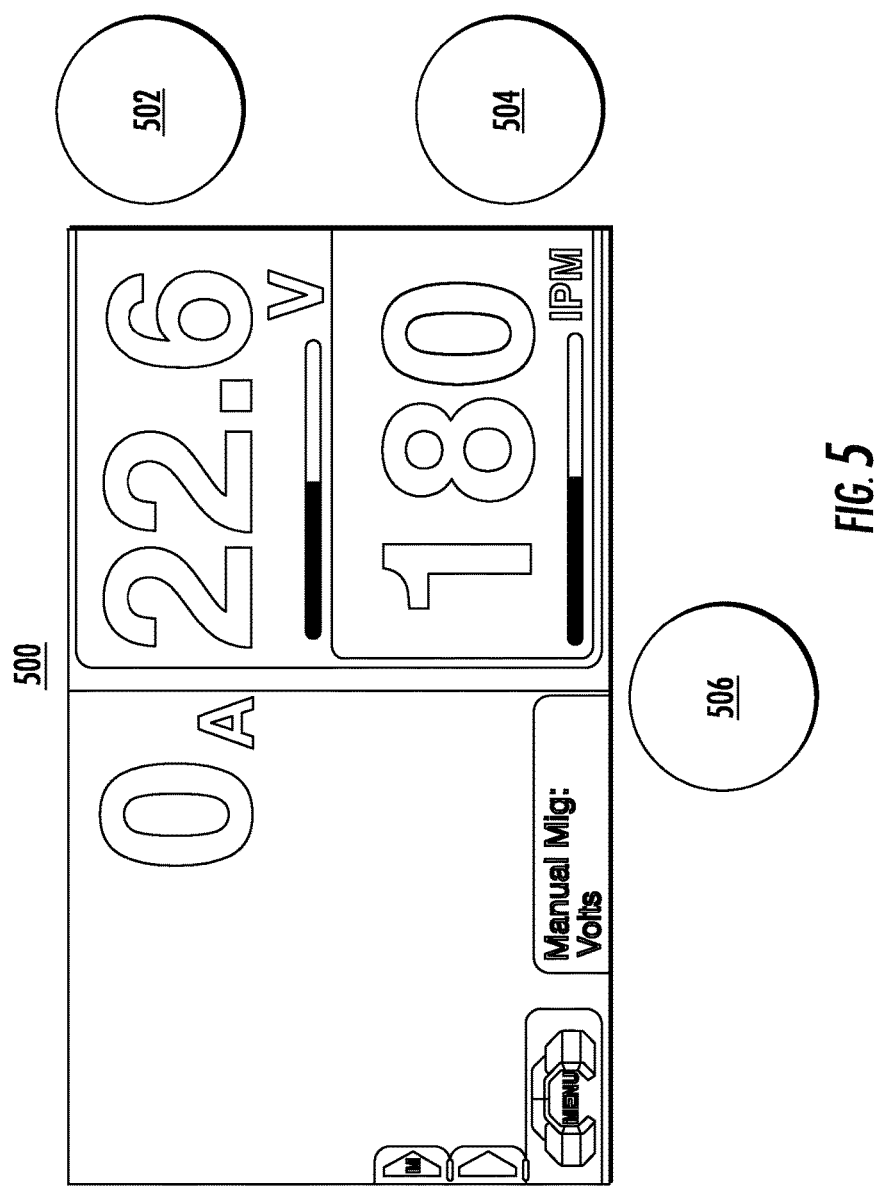

In some embodiments, knobs may be dedicated to each value in a particular mode, making it readily accessible to users during welding. As shown in FIGS. 4 and 5, adjustable values may be displayed within the user interface based upon which value is currently being modified. For example, knob 302 may be used to adjust the voltage value and knob 304 may be used to adjust the IPM value. In FIG. 4, the voltage value may be displayed with a black background, white text, and a red slider bar to indicate that knob 402 is currently being rotated to adjust the voltage value. Likewise, in FIG. 5, the IPM value may be displayed with a black background, white text, and a red slider bar to indicate that knob 504 is currently being rotated to adjust the IPM value.

Figure 6:
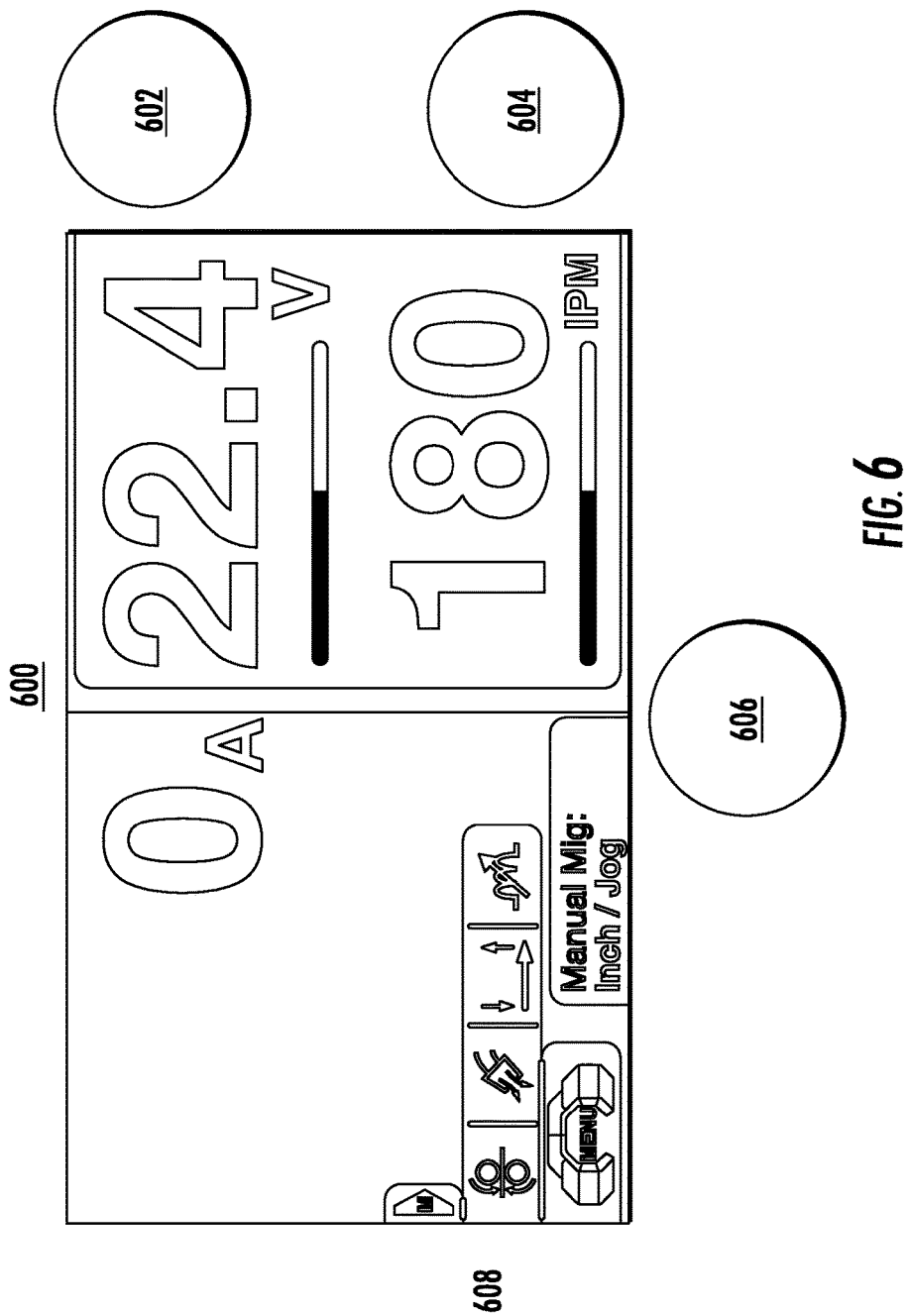
Figure 7:
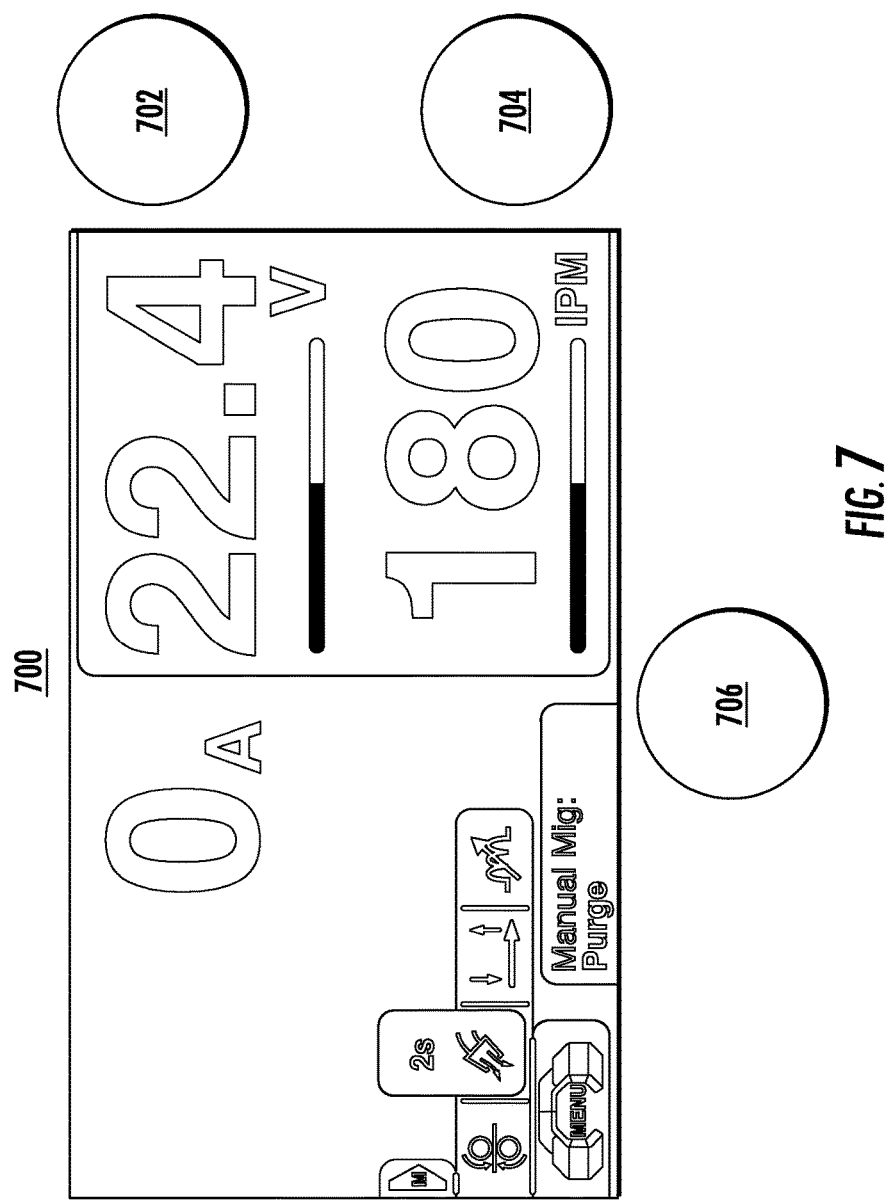
Figure 8:
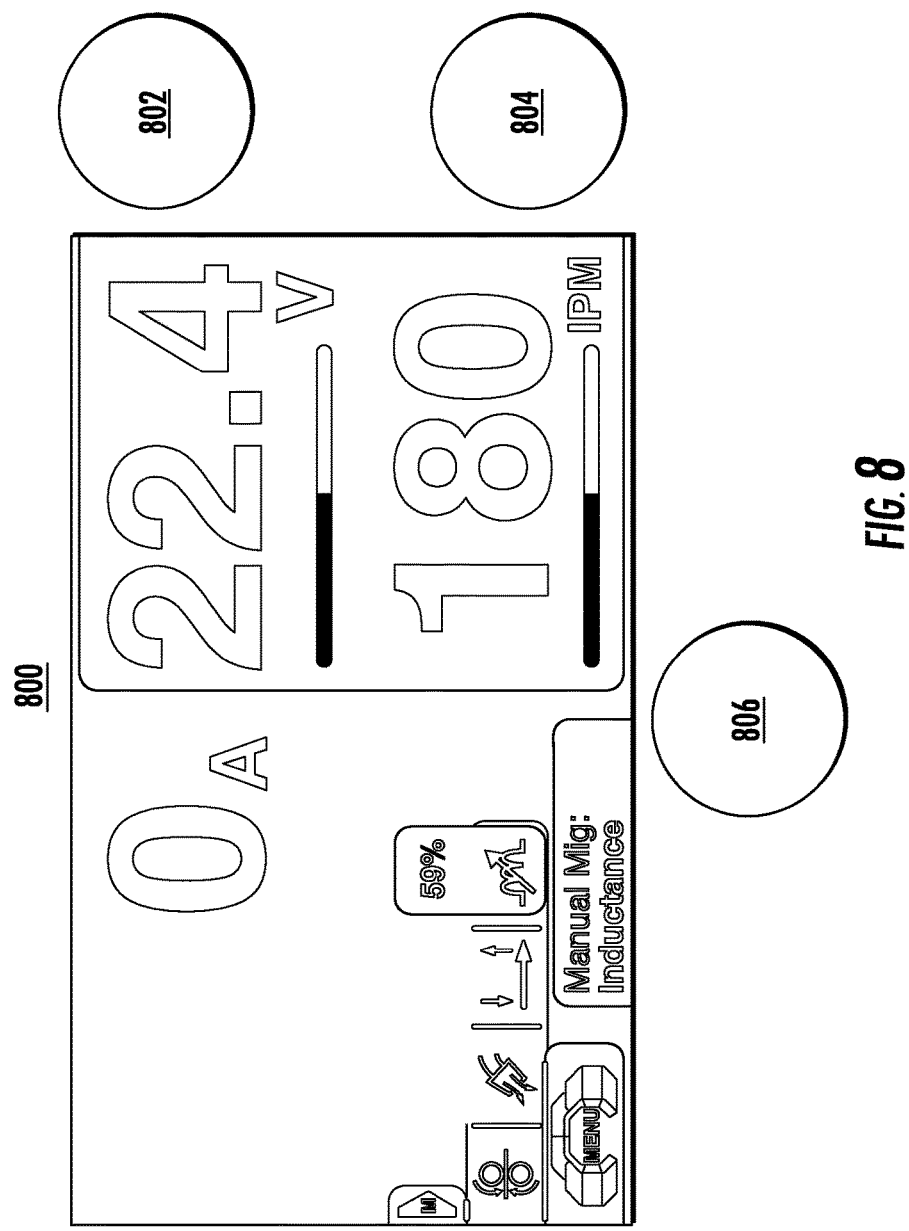

As shown in FIG. 6, the left portion of user interface 600 may be navigated using one of the knobs, in this case, knob 606. For example, knob 606 may be rotated to select a popup menu (displayed as a selectable arrow in FIG. 5), to expose various additional settings. In this manner, additional settings may be accessed using user interface 600, while still displaying important information elsewhere in the user interface. As shown within FIGS. 7 and 8, knob 706 (and 806) may be used to select user interface items within a popup menu. In some embodiments, the knob may be rotated to highlight a popup menu item, pushed to select the popup menu item, and rotated again to make adjustments to settings associated within the popup menu item. As popup menu items are selected using knob rotation, an indication of the menu item may be displayed within the user interface. As shown in FIG. 7, the "Purge" popup menu item has been selected, and as shown within FIG. 8, the "Inductance" popup menu item has been selected.

Figure 9:
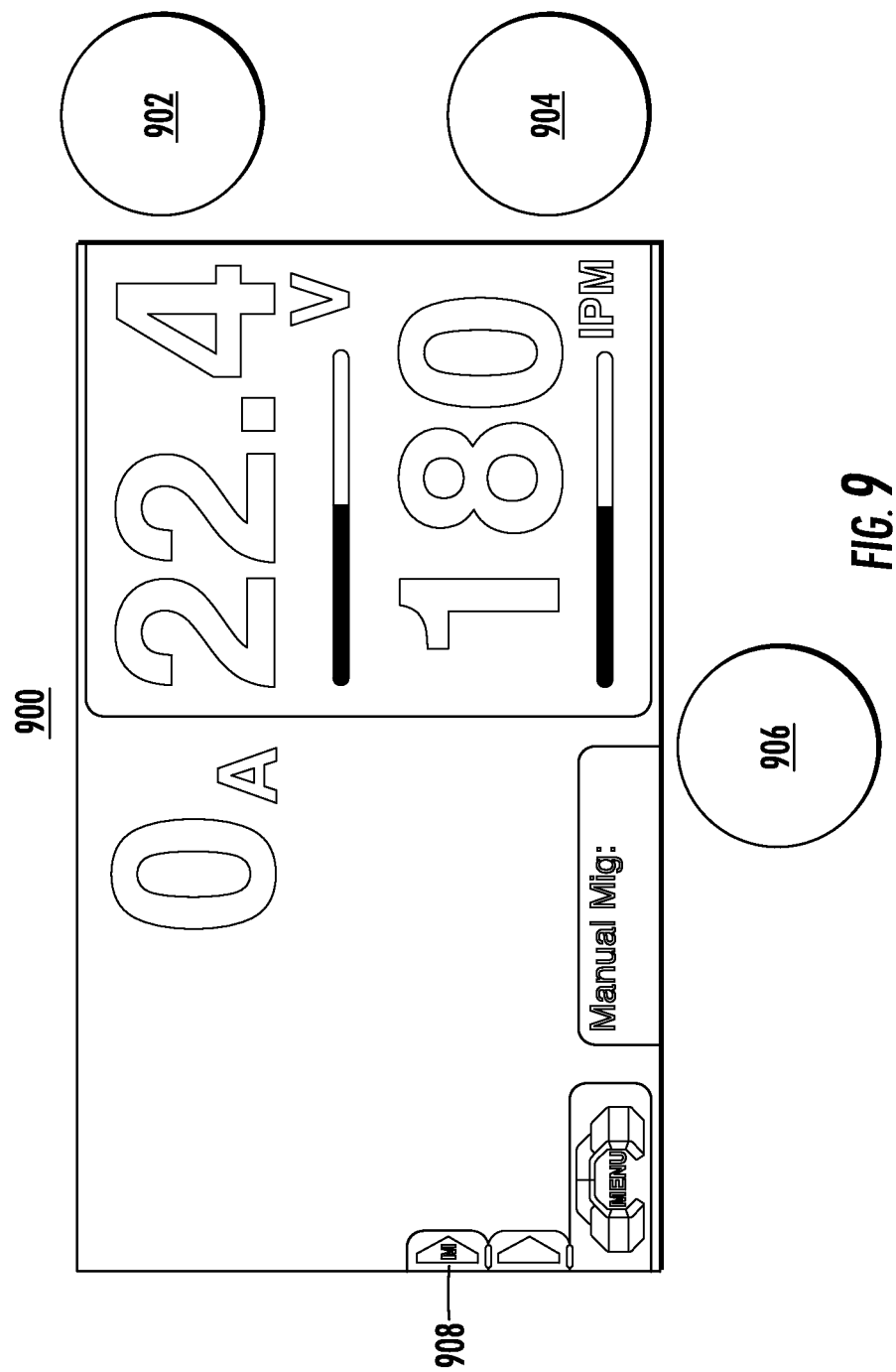
Figure 10:
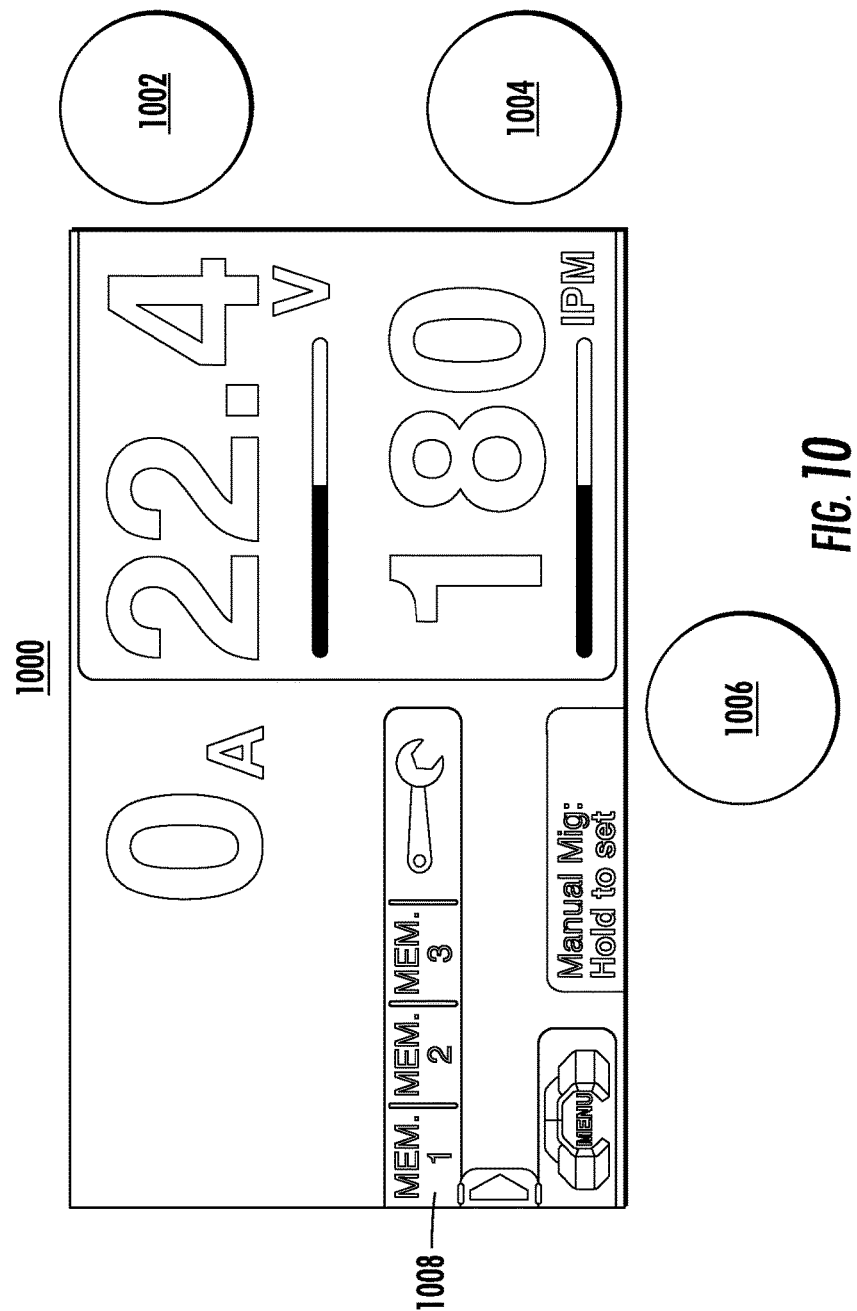
Figure 11:
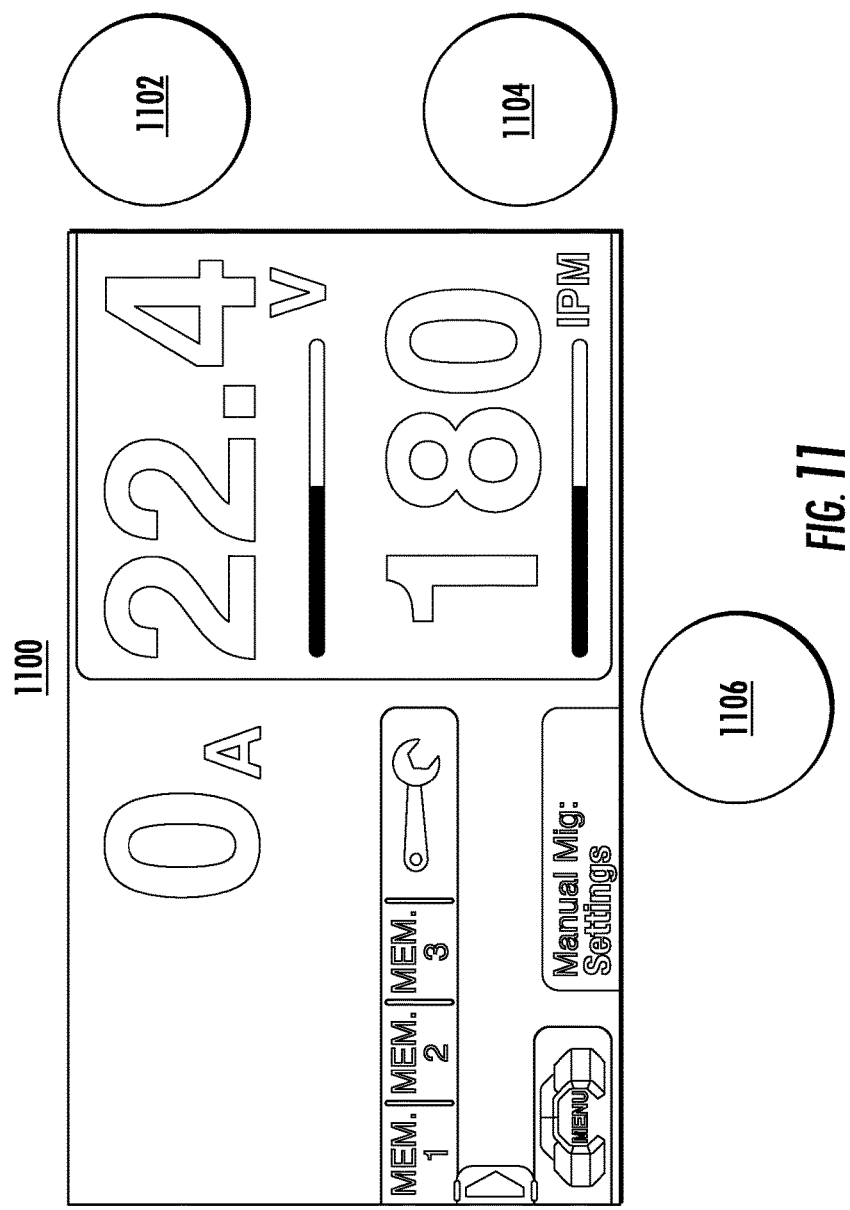
Figure 12:
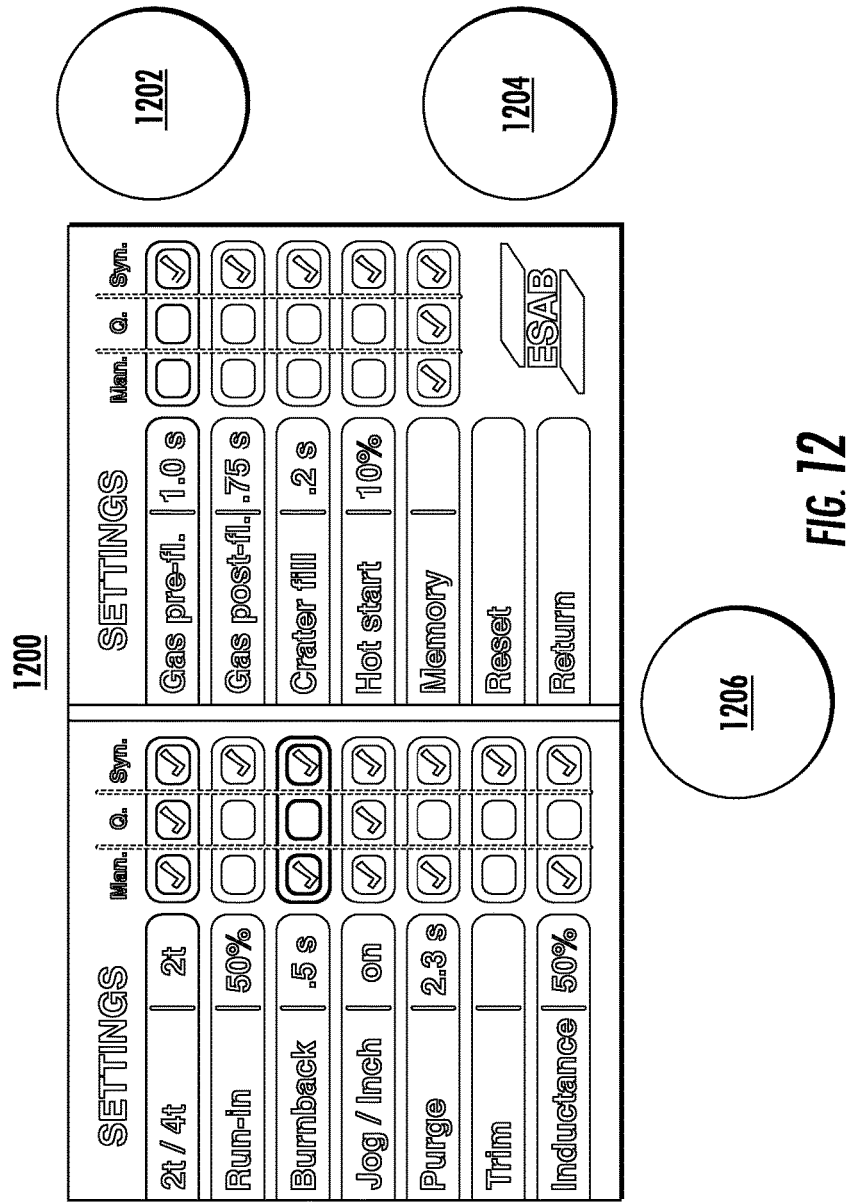

As shown in FIGS. 9-12, a user interface for a portable welding system may include access to one or more memory settings. Memory settings may be stored in one or more memories, such as memory 114. In an example, FIG. 9 illustrates that knob 906 may be used to highlight memory tab 908. Once highlighted and selected, memory tab 908 may expand to include one or more additional user interface elements 1008, as illustrated within FIG. 10. These additional user interface elements may provide the user with access to one or more memory slots, or configurable settings for the portable welding system. Memory slots may be used to store preset welding parameters, and settings may be selected, which include a variety of options for configuring a portable welding system, as illustrated within FIGS. 11 and 12.

In an embodiment, once values have been set, such as voltage and IPM, a memory slot may be highlighted using knob 1006, and the user may be directed to press knob 1006 for a period of time to save currently displayed values in a highlighted memory slot so that the saved information may be recalled later. Saved values may be stored locally, as previously described, or may be saved remotely via a network connection, which is described in more detail below with respect to FIG. 44. In an embodiment, a user of a portable welding system may be able to log into an account using a user interface and retrieve previously-stored configurations and other setting information via a network.

Figure 13:
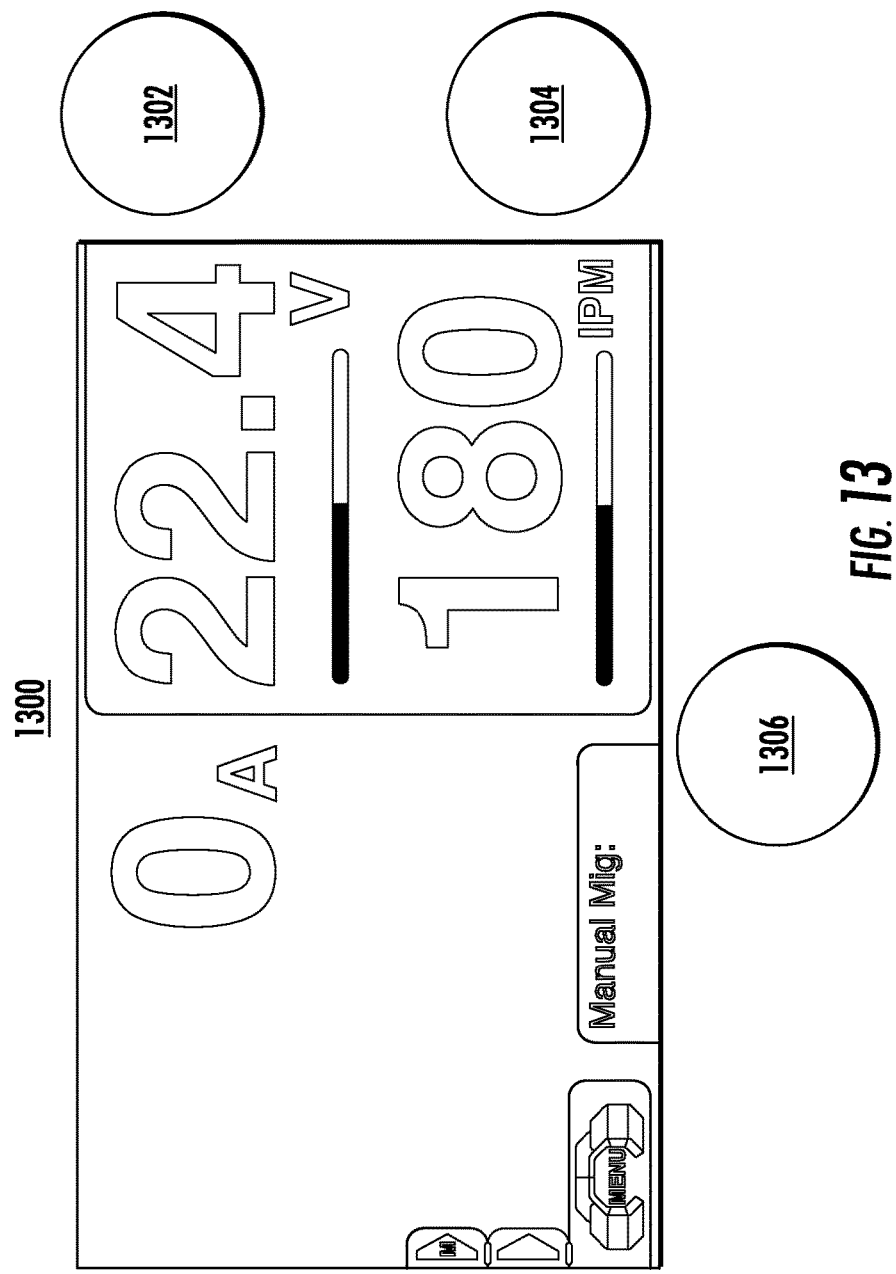
Figure 14:
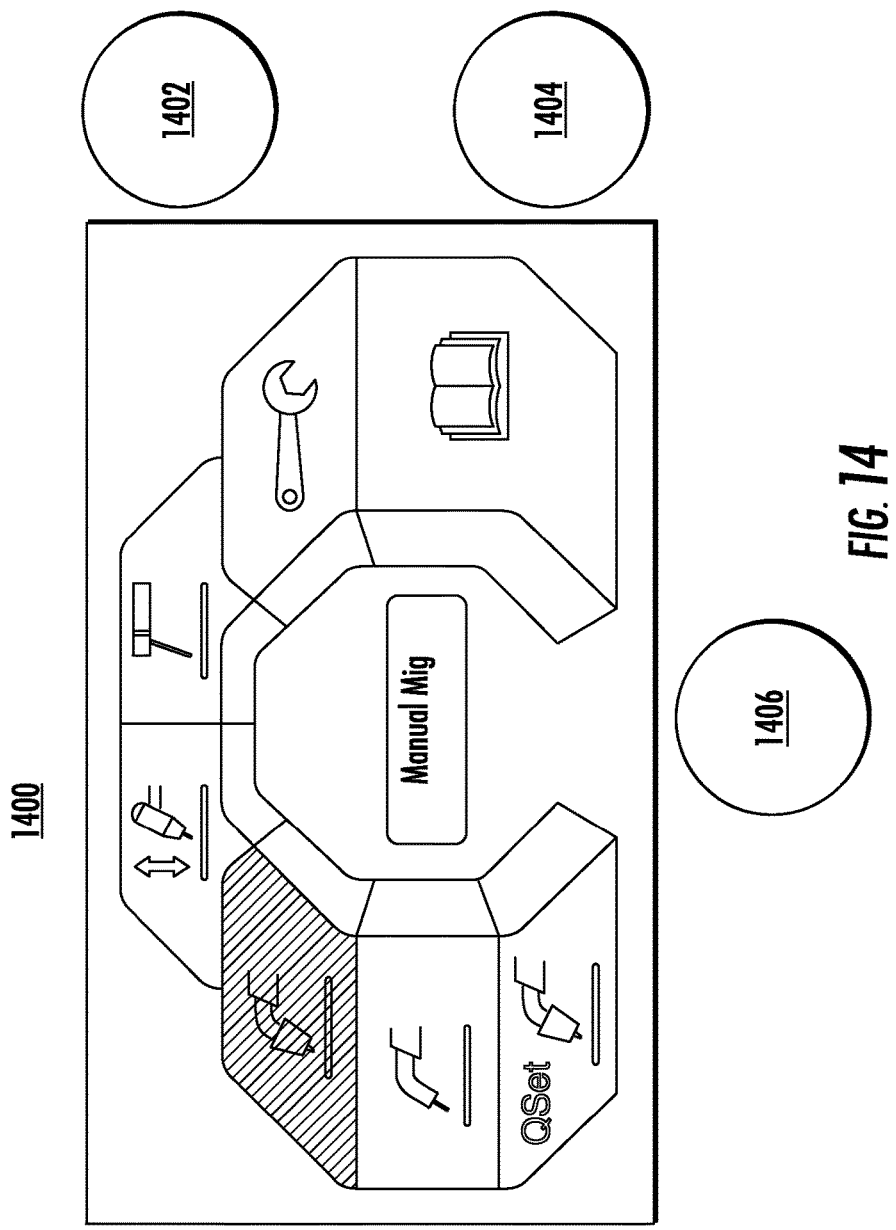
Figure 15:
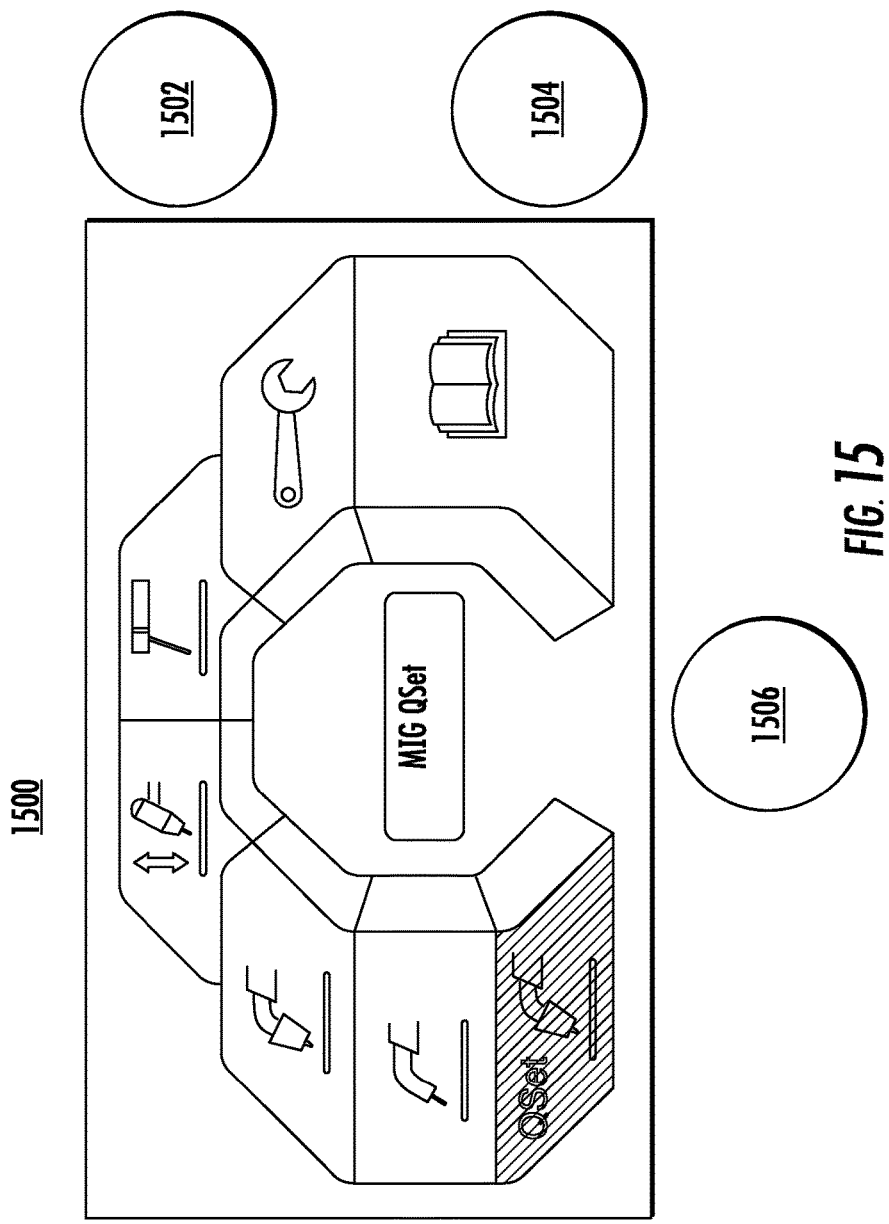

FIGS. 13-15 illustrate exemplary user interfaces showing the highlighting and selection of a different mode for a portable welding system. For example, as shown in FIG. 13, a main menu user interface element may be selected from within a particular mode and selected to return to the main menu. As shown in FIG. 14, a highlighted "Manual MIG" mode may be changed to a "QSet™" mode by rotating one of knobs 1402, 1404, or 1406, and "QSet™" mode may be entered by pressing one of knobs 1402, 1404, or 1406.

FIGS. 16-25 illustrate exemplary user interfaces for a "QSet™" (or quick set) mode of a portable welding system. A quick set mode may configure a portable welding device based upon minimal settings input from a user via a user interface. For example, pre-programmed information, or information loaded over a network to a portable welding system, may be used to configure the portable welding system automatically based upon some user input.

Figure 16:
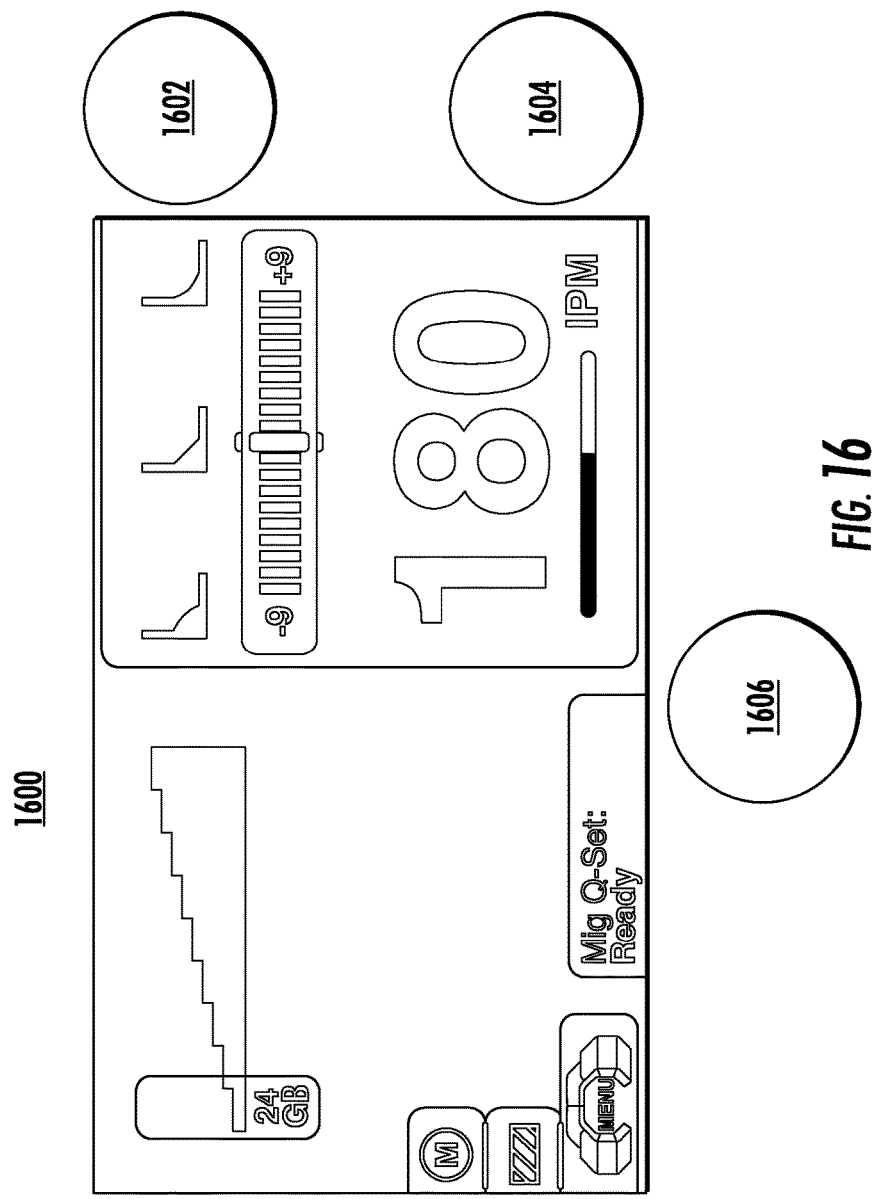
Figure 17:
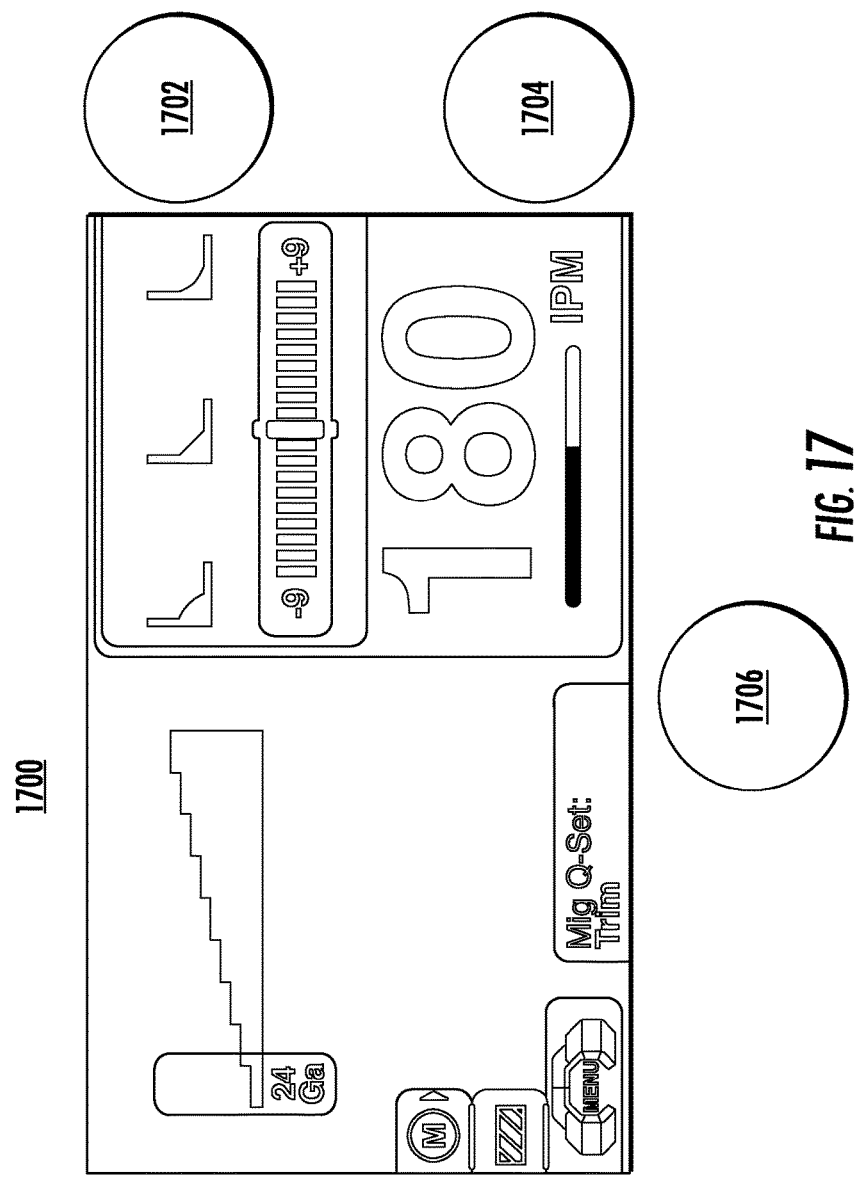

As shown within FIG. 16, a gray background with shadow may indicate an active portion of user interface 1600. As previously discussed, knobs may be dedicated to different portions of the user interface in certain modes. For example, in quick set mode, knob 1602 may be dedicated to a trim adjustment value and knob 1604 may be dedicated to an IPM value. In an embodiment, shown in FIG. 17, when active adjustment is occurring, such as using knob 1702 for trim adjustment, the associated portion of the user interface may change appearance, such as changing to a black background with white letter and red highlighting a current adjustment value. In this manner, users can clearly see changes being made to the portable welding system, increasing usability and safety.

Figure 18:
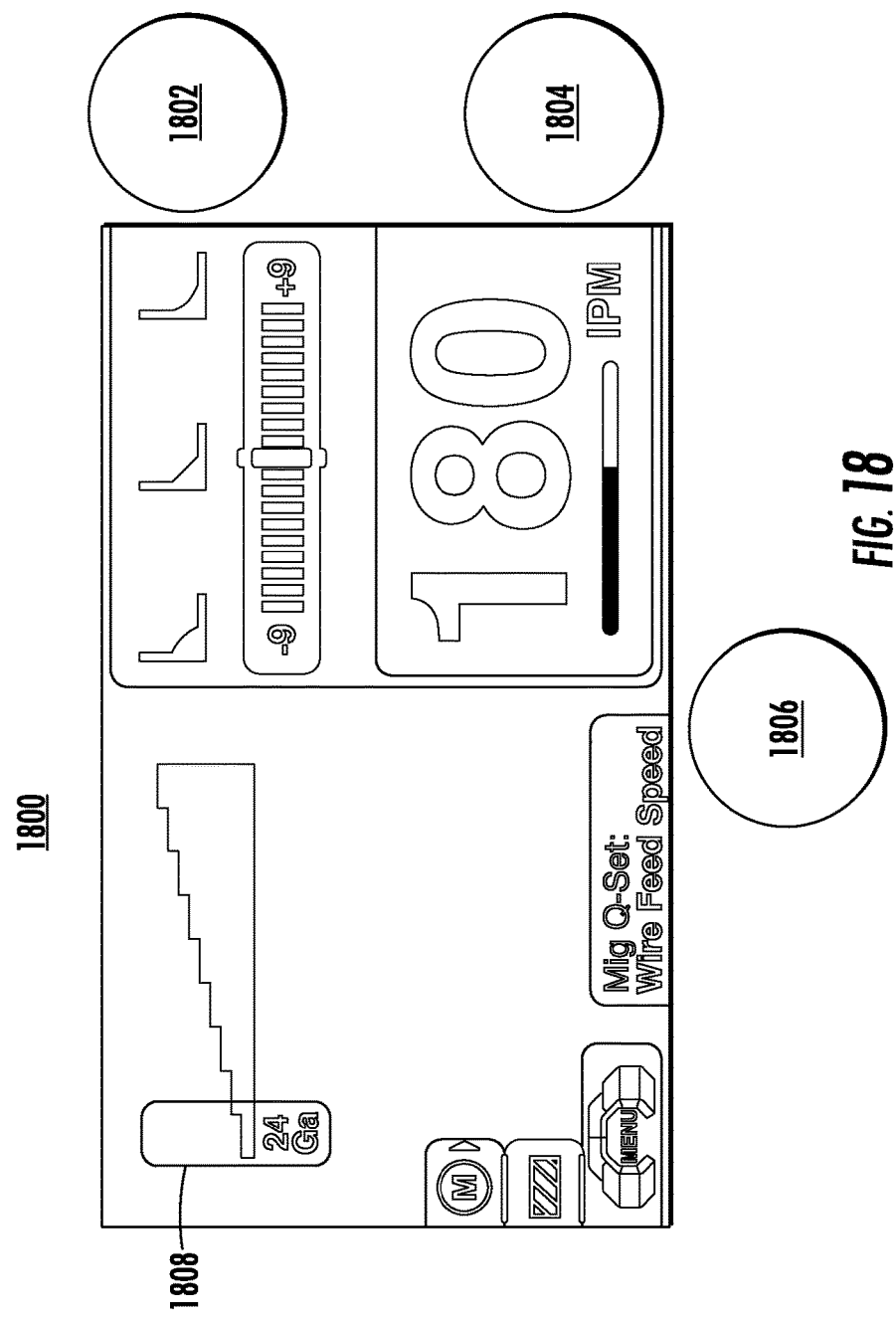

As shown in FIG. 18, portions of user interface 1800 may indicate when a value that is not adjustable, such as plate thickness 1808, is changed due to the adjustment of an adjustable value, such as IPM. As shown, as IPM is adjusted using knob 1804, a slider bar associated with IPM may be turned red, or another highlight color, during adjustment, and a box indicating plate thickness may be changed to a similar highlight color to indicate that the plate thickness is being affected or changed by virtue of adjustments directly made via knob 1804 to IPM. In some embodiments, visual changes to the display of adjustable and non-adjustable values may be made within the user interface 1800 substantially at the same time.

Figure 19:
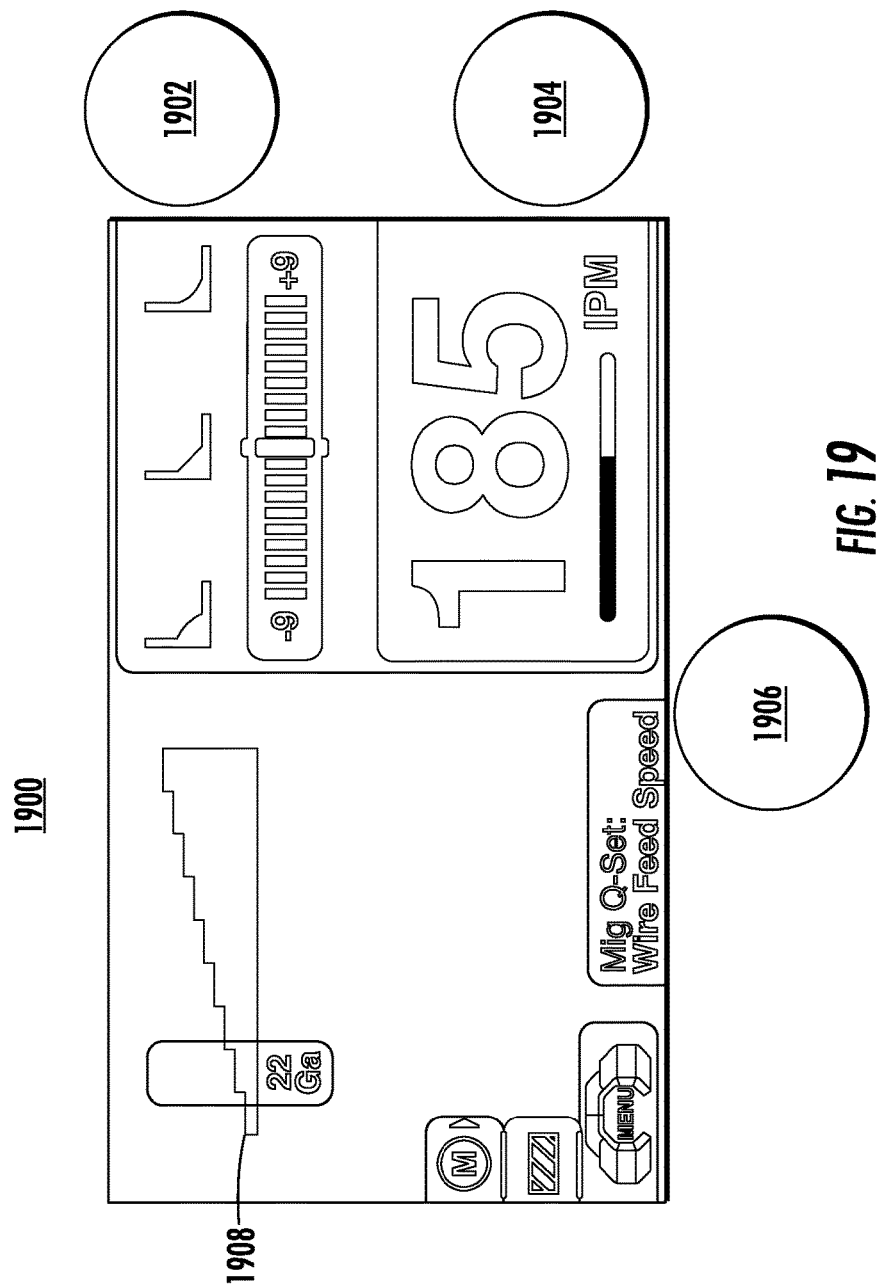
Figure 20:
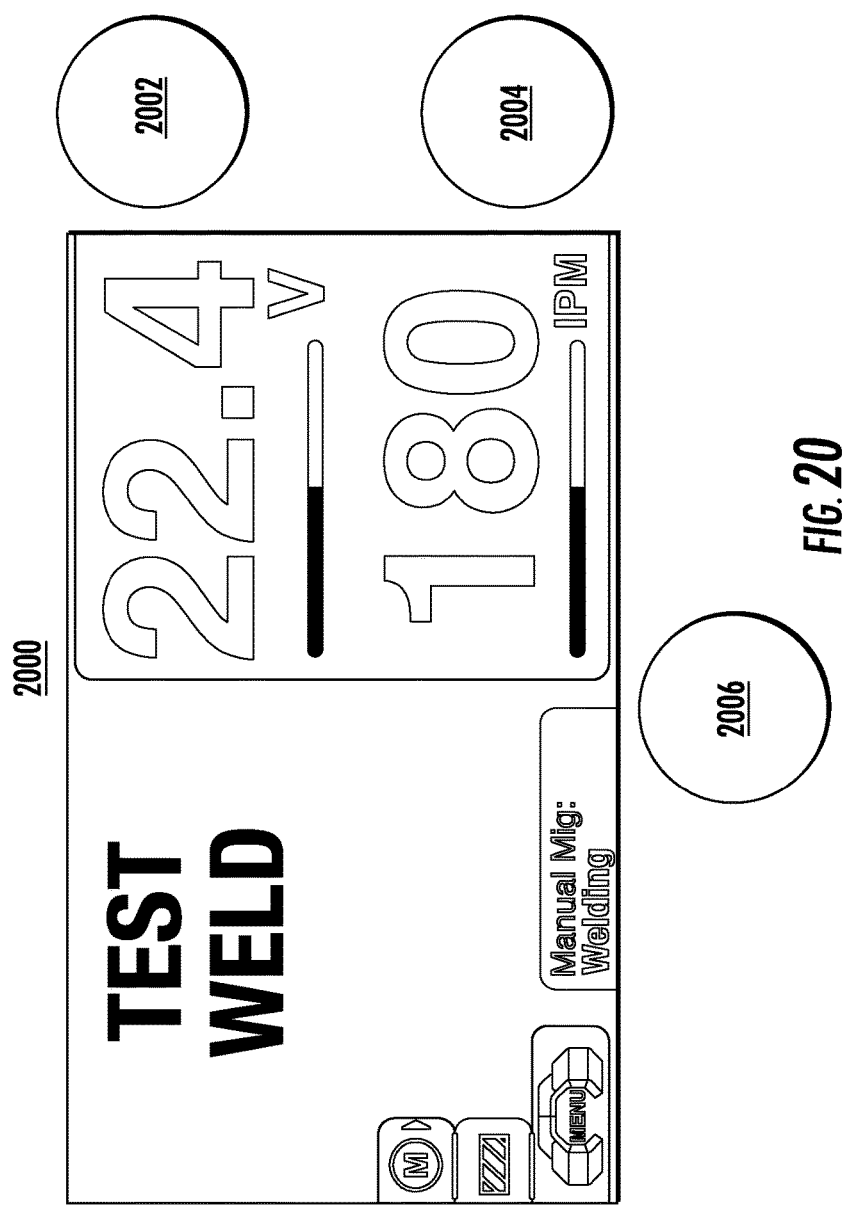
Figure 21:
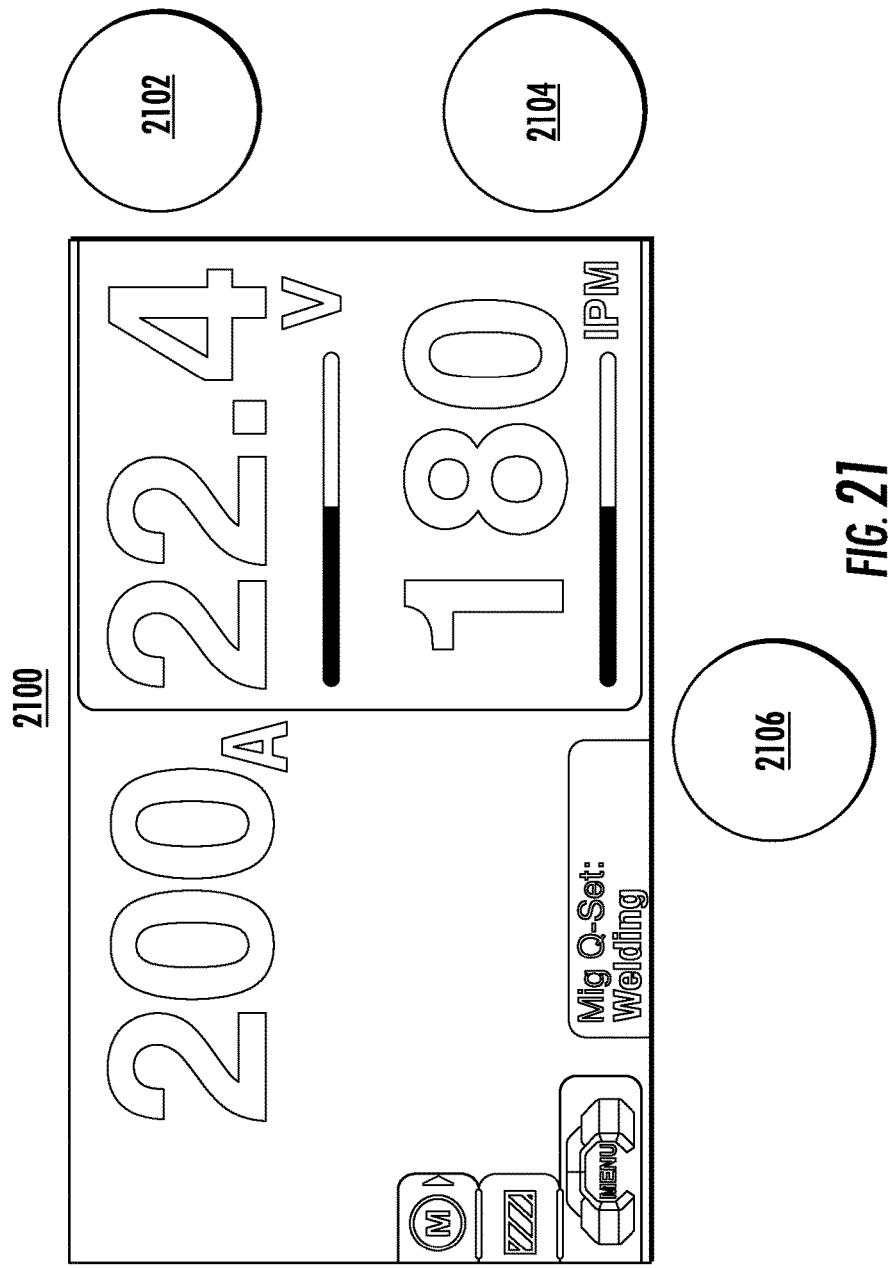

As shown in FIG. 19, the material gauge for plate thickness 1808 has changed from 24 in FIG. 18 (associated with 180 IPM) to a plate thickness 1908 of 22 in FIG. 19, associated with 185 IPM. Further, as illustrated between FIGS. 18 and 19, display of plate thickness may display a relative graphical indication as to the thickness using a rising thickness scale.

As discussed above, a user interface may support a quick set mode, which may take as input one or more parameters, such as IPM or trim adjustment values, and may automatically generate values for other welding parameters, such as plate thickness. As illustrated within FIG. 20, the user interface may indicate that a test weld is taking place after values have been entered by the user. Further, as discussed previously, during active welding, some portions of the user interface 2000 may be display in high contrast (such as black text on a white background). Once a test weld process has completed (after a defined period of time), user interface 2100 in FIG. 21 may display amperage rather than a "test weld" message, indicating to the user that a test weld is complete.

Figure 22:
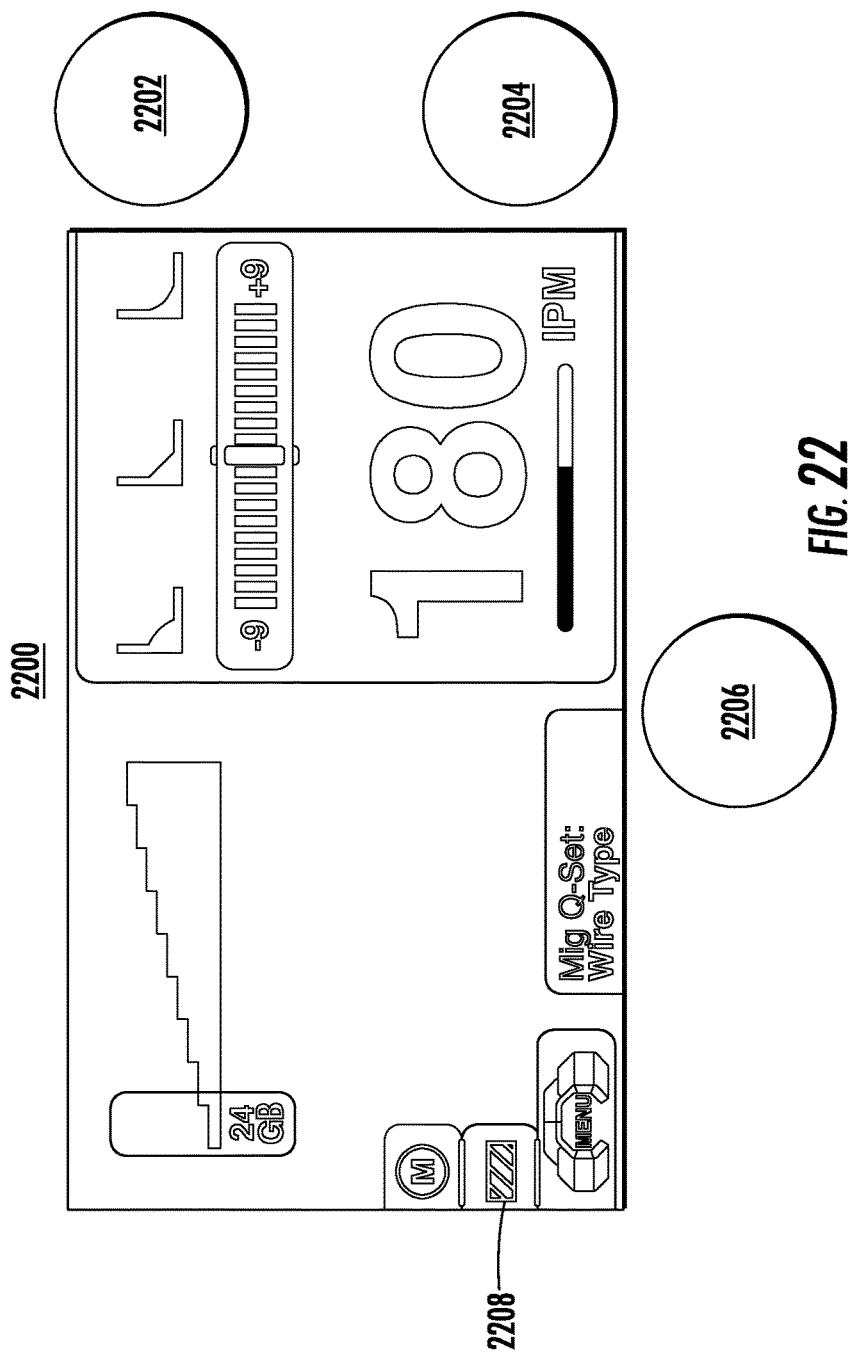
Figure 23:
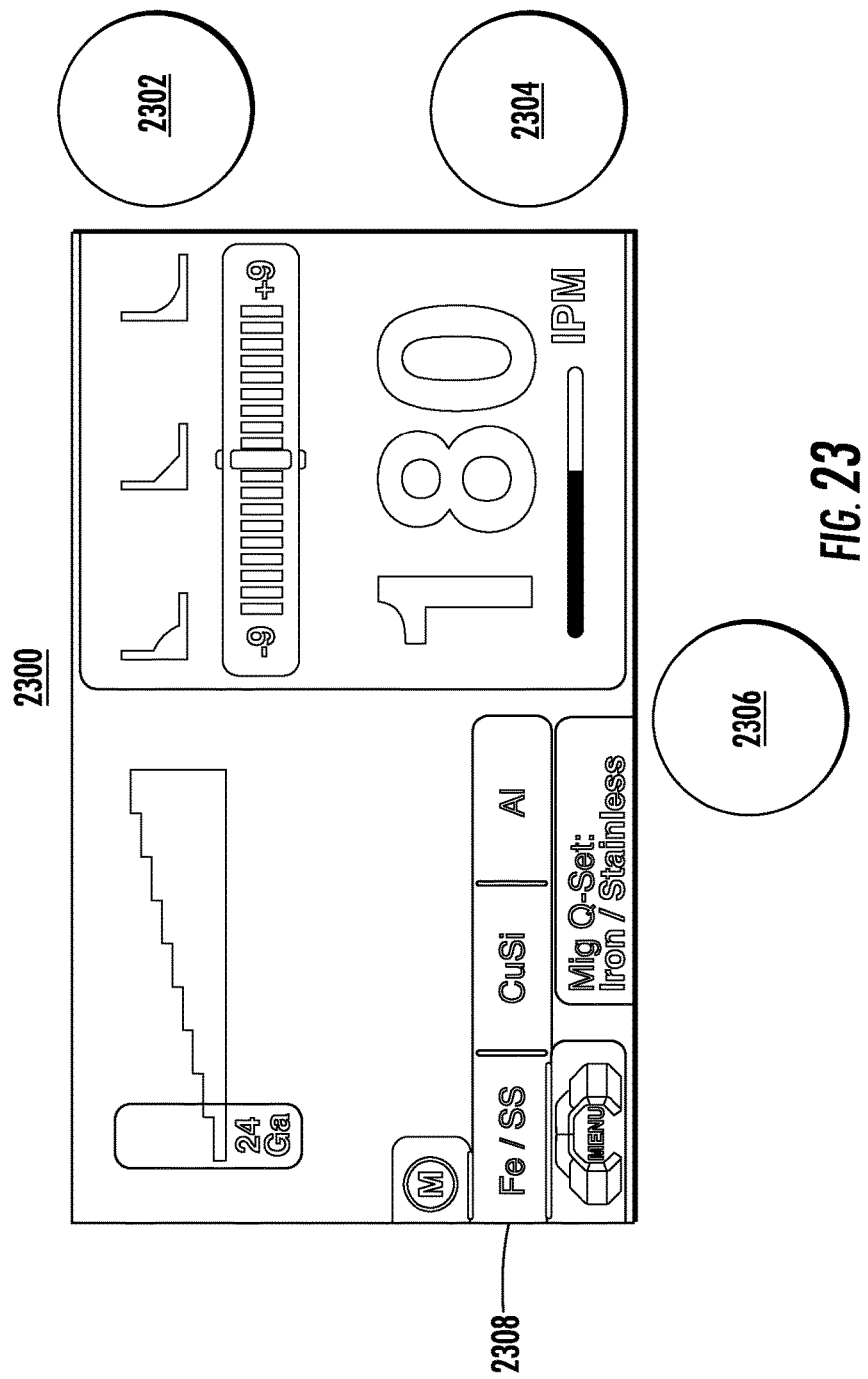

Referring now to FIGS. 22 and 23, a quick set mode may include popup menus for various parameters. In one example, a popup menu may allow a user to adjust a wire type. Like previous popup menus, knob 2206 may be used to highlight a popup menu indicator 2208. Once selected by pressing knob 2206, FIG. 23 shows popup menu 2308, which provides various options that may be selected using techniques described herein.

Figure 24:
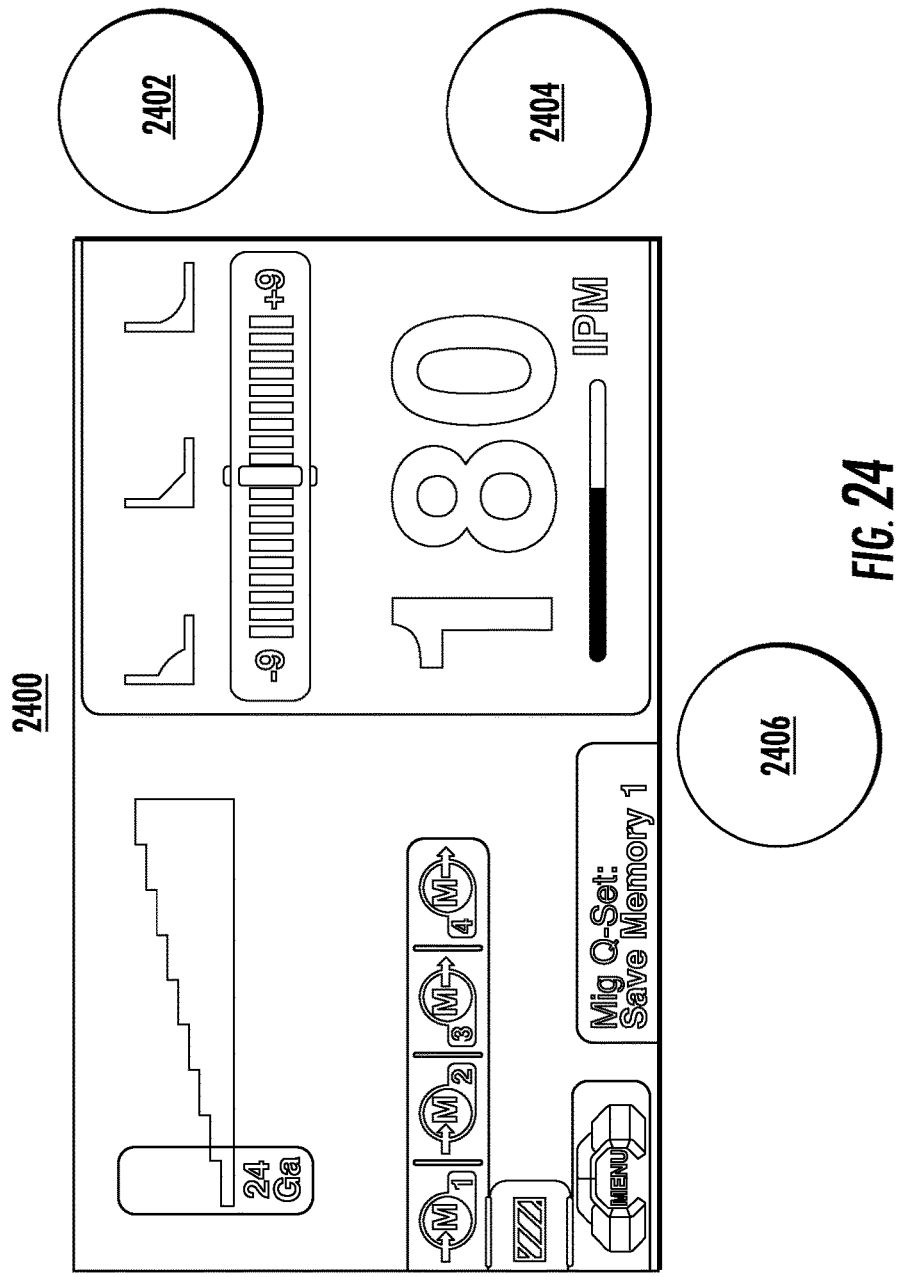

As shown in FIG. 24, a quick set mode may also include a memory function, which may be accessed and set by a user in a manner similar to the memory function described previously with respect to FIGS. 9-12.

Figure 25:
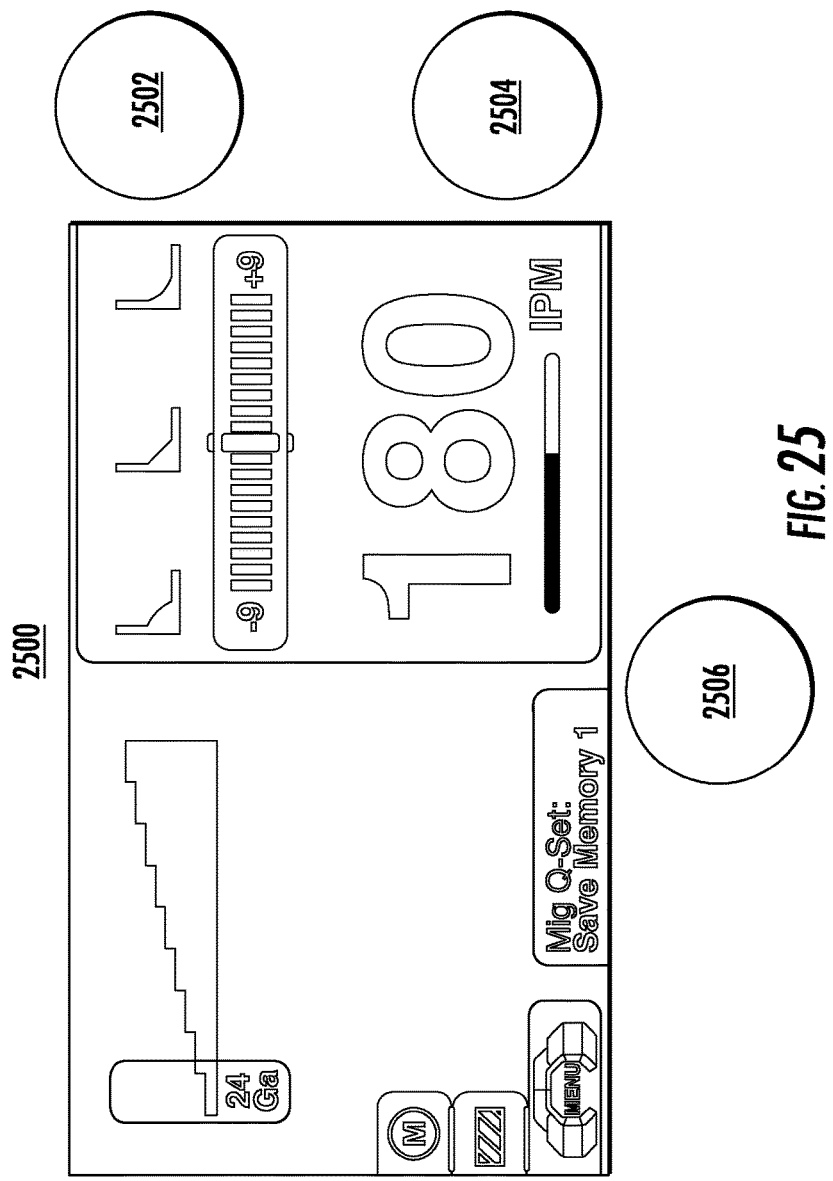
Figure 26:
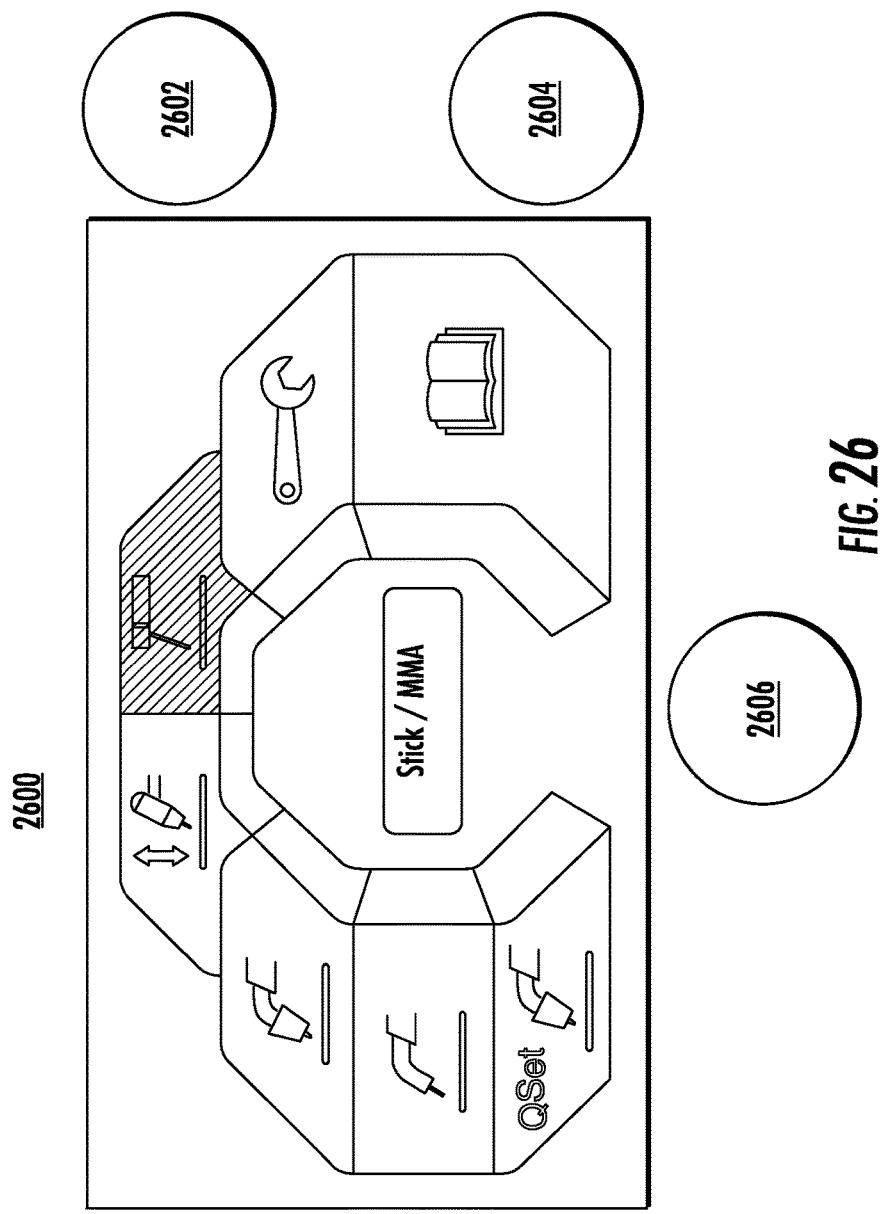

FIGS. 25 and 26 illustrate an exemplary user interface showing the highlighting and selection of a different mode for a portable welding system. For example, as shown in FIG. 25, a main menu user interface element may be selected, and in FIG. 26, a selected "Stick/MMA" mode may be highlighted by rotating one of knobs 2602, 2604, or 2606, and selected by pressing one of knobs 2602, 2604, or 2606.

Figure 27:
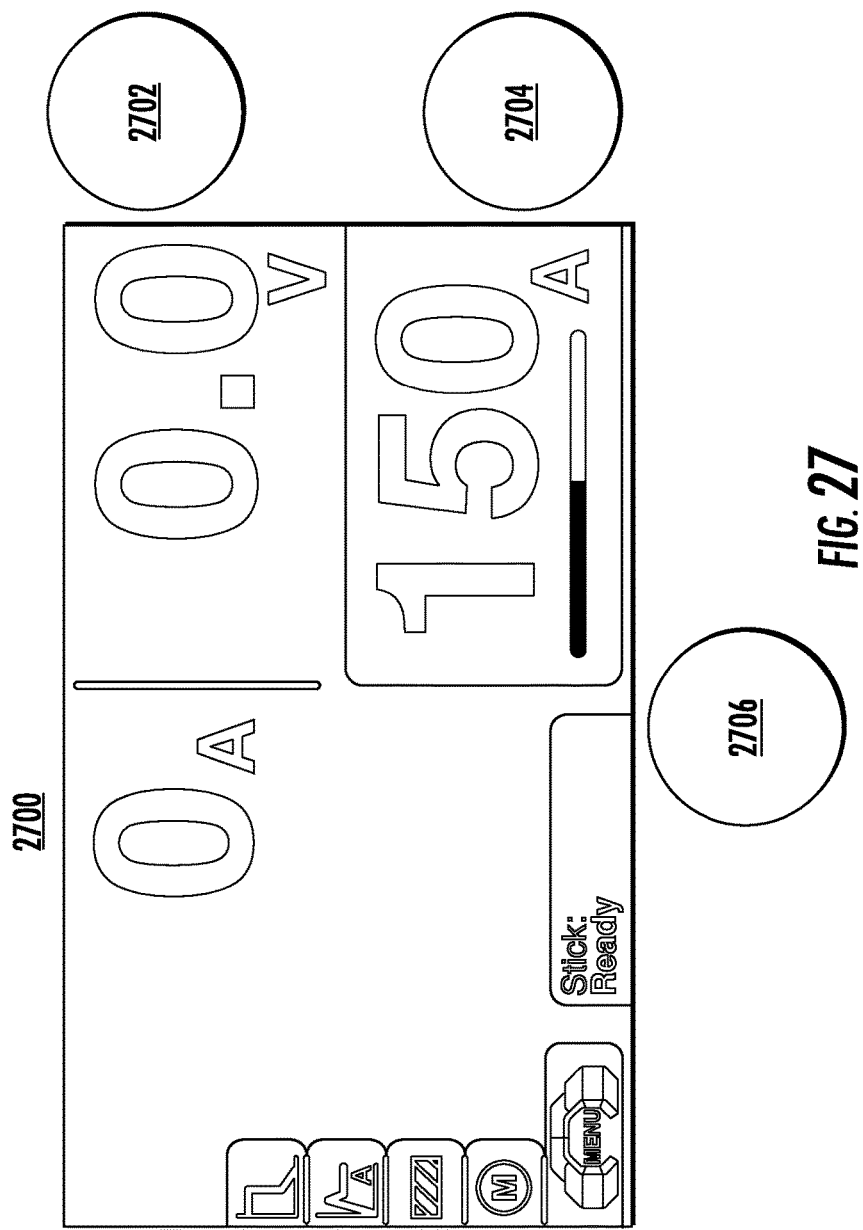
Figure 28:
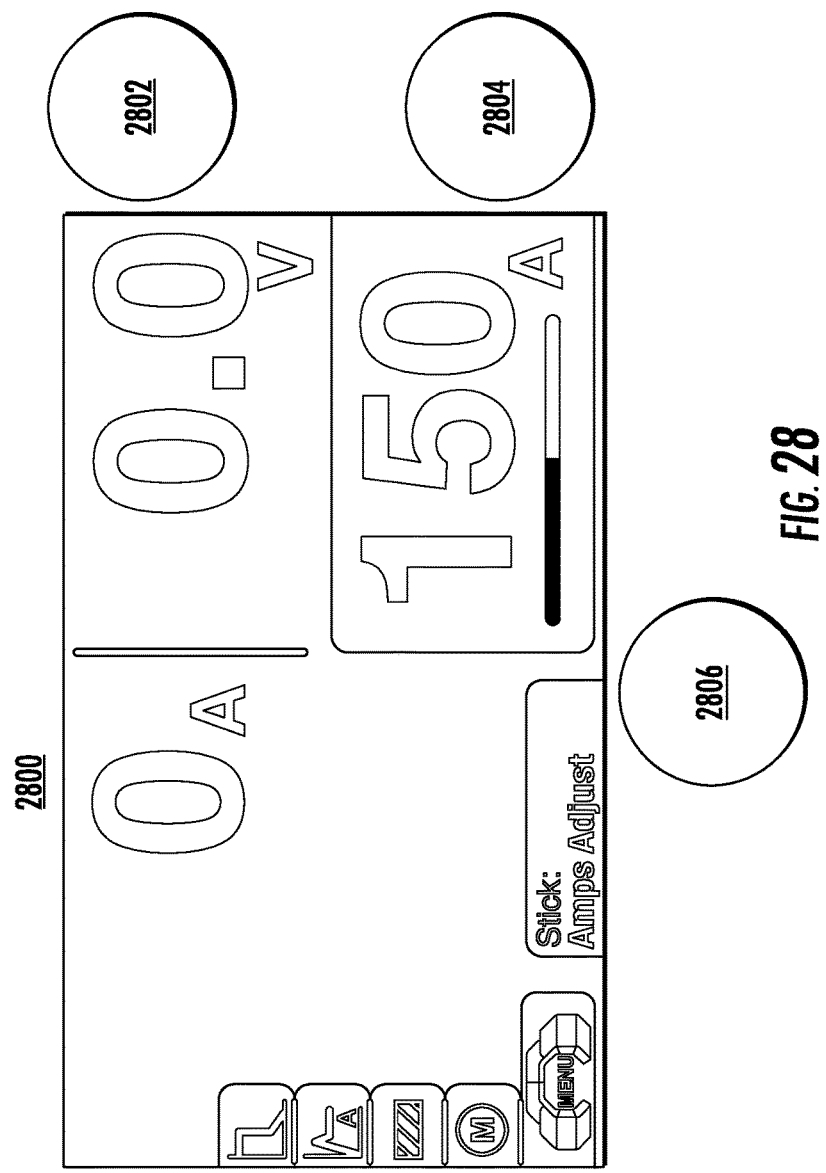

FIGS. 27-35 illustrate exemplary user interfaces for a stick/MMA mode of a portable welding system. As shown in FIG. 27, the background color scheme for stick/MMA mode matches that of the stick/MMA main menu user interface element (both orange). In addition, only one section of the user interface, amperage, is gray in color, which indicates that it is the only directly adjustable value in the mode. Operation of the user interface in stick/MMA mode may be similar to previous modes. For example, as shown in FIG. 28, during active adjustment using knob 2804, the amperage section of the user interface switches to a black background, white text, and a red slider bar indicates that changes are being made on a relative scale.

Figure 29:
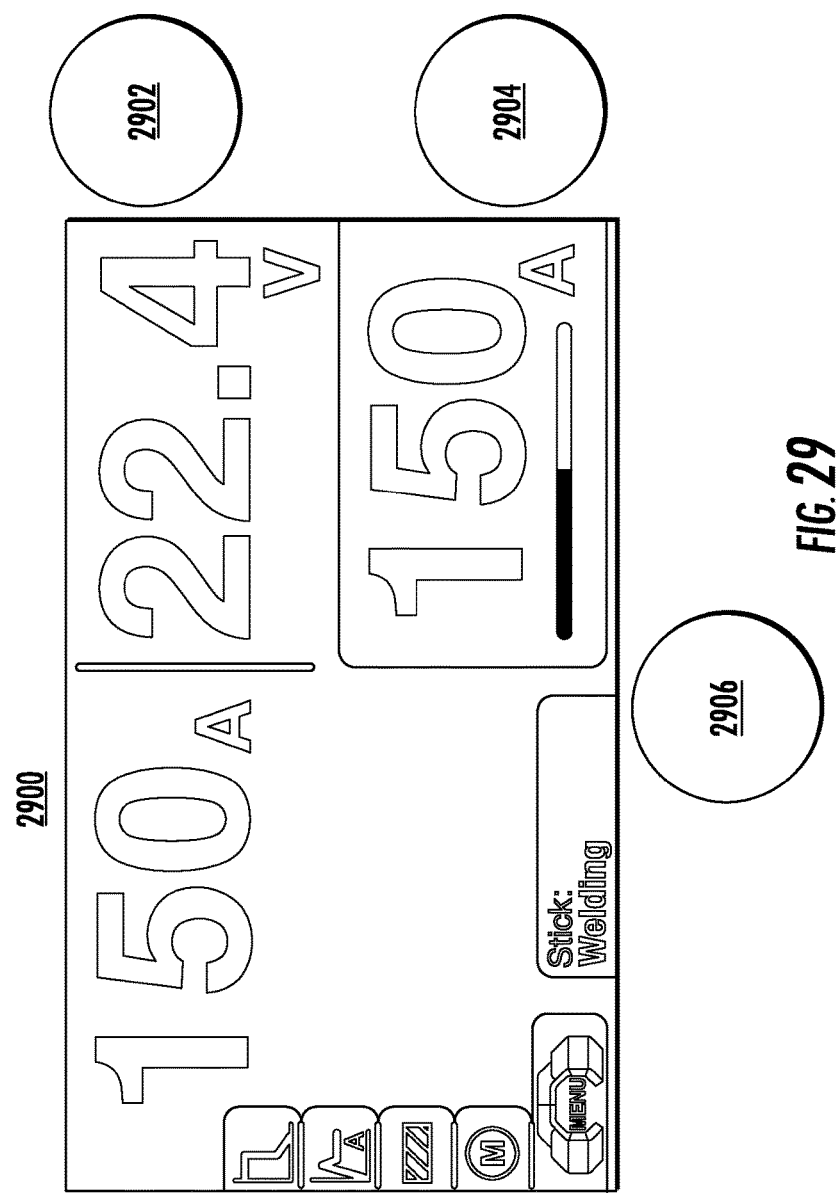

Other portions of the user interface in stick/MMA mode may differ from previously discussed modes. For example, as shown in FIG. 29, amperage may be displayed twice, once in a directly user-adjustable section, and second in a non-adjustable background section. The non-adjustable amperage may indicate an actual measured amperage, rather than a user-selected amperage. In some embodiments, measured values for actual amperage and voltage may be displayed during welding and for a defined period of time after welding has completed.

Figure 30:
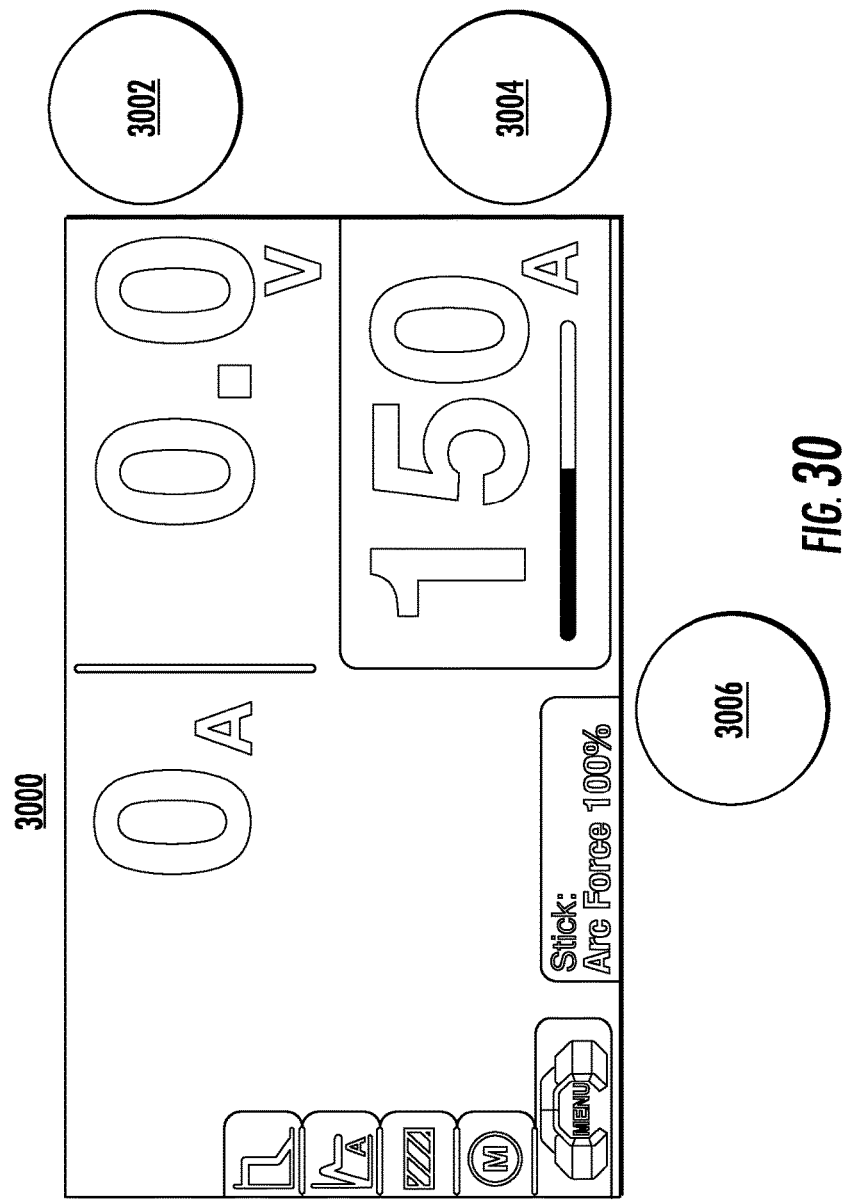
Figure 31:
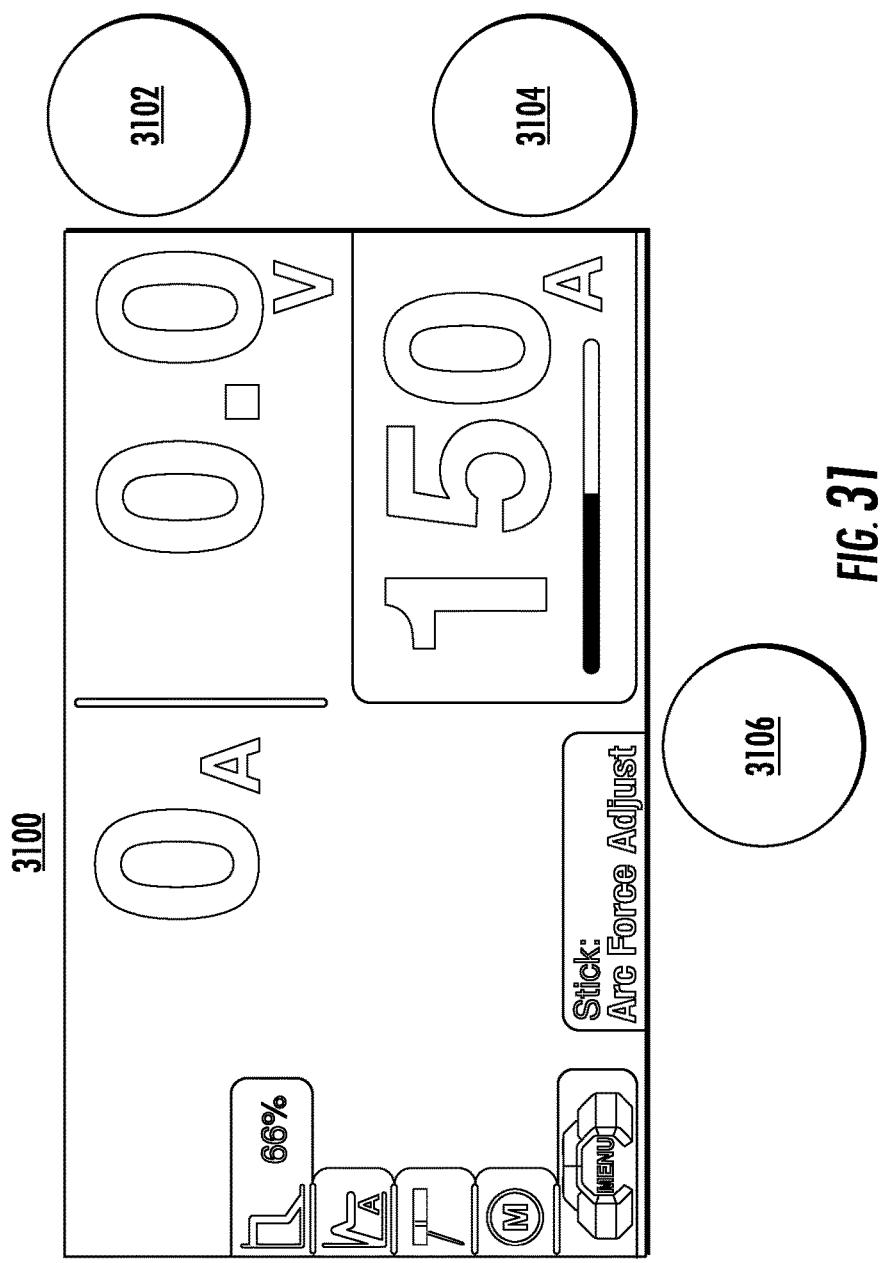
Figure 32:
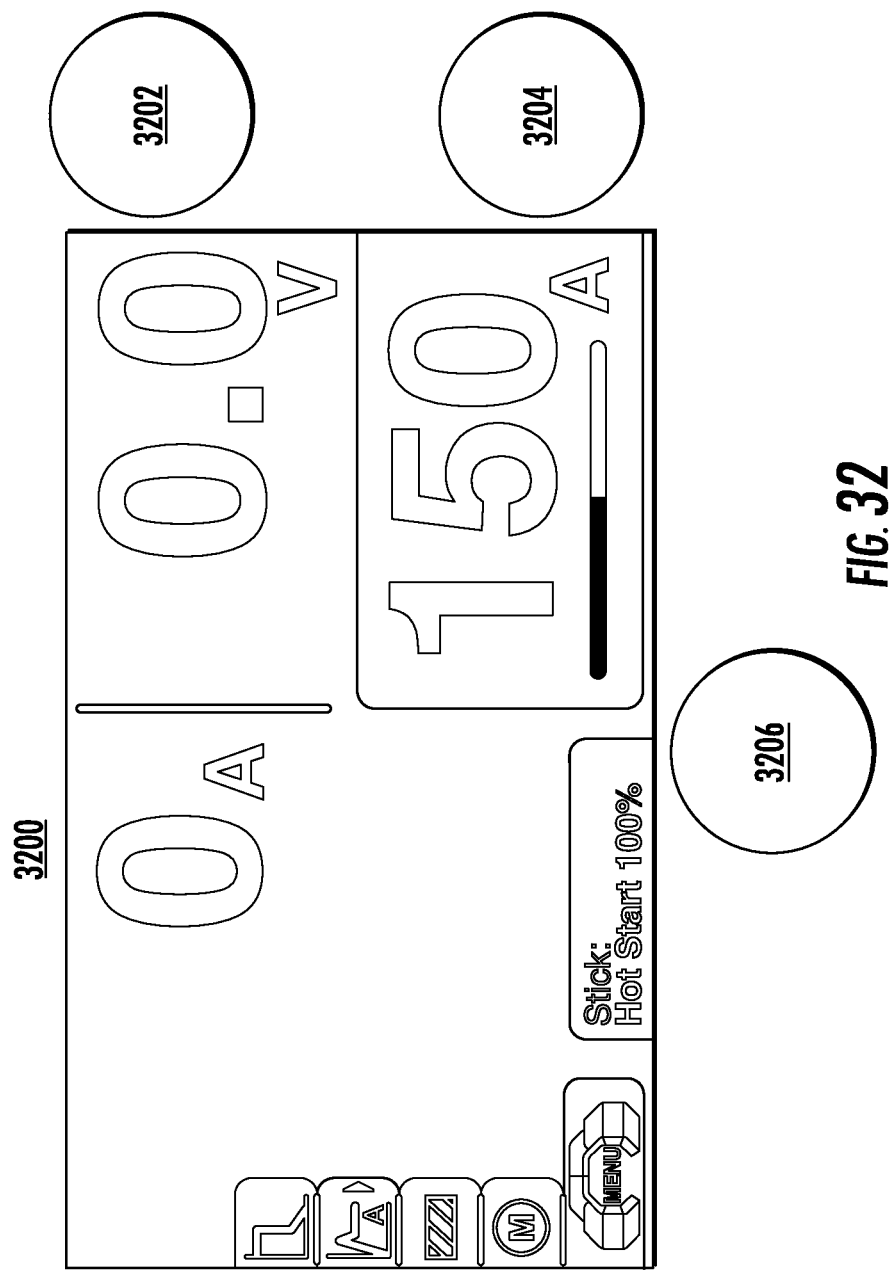
Figure 33:
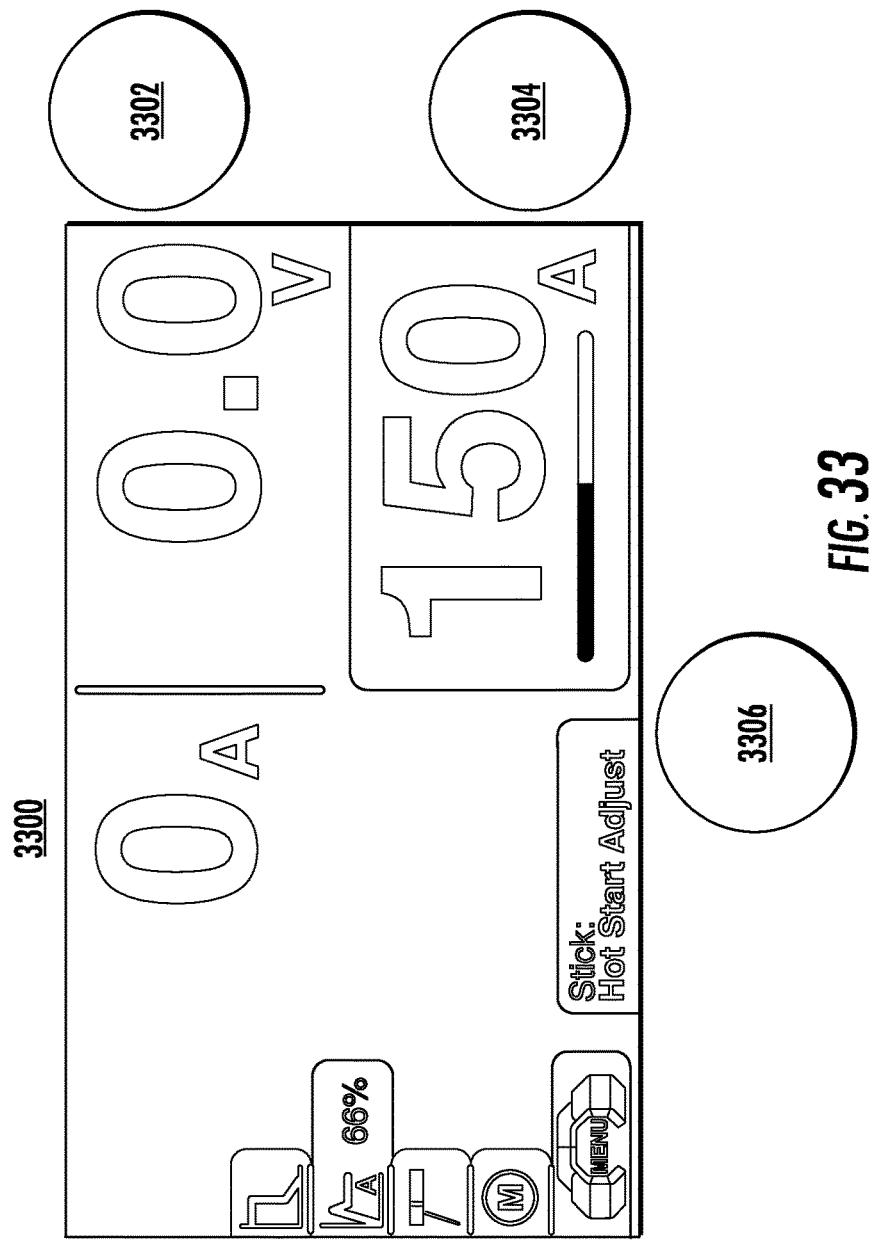
Figure 34:
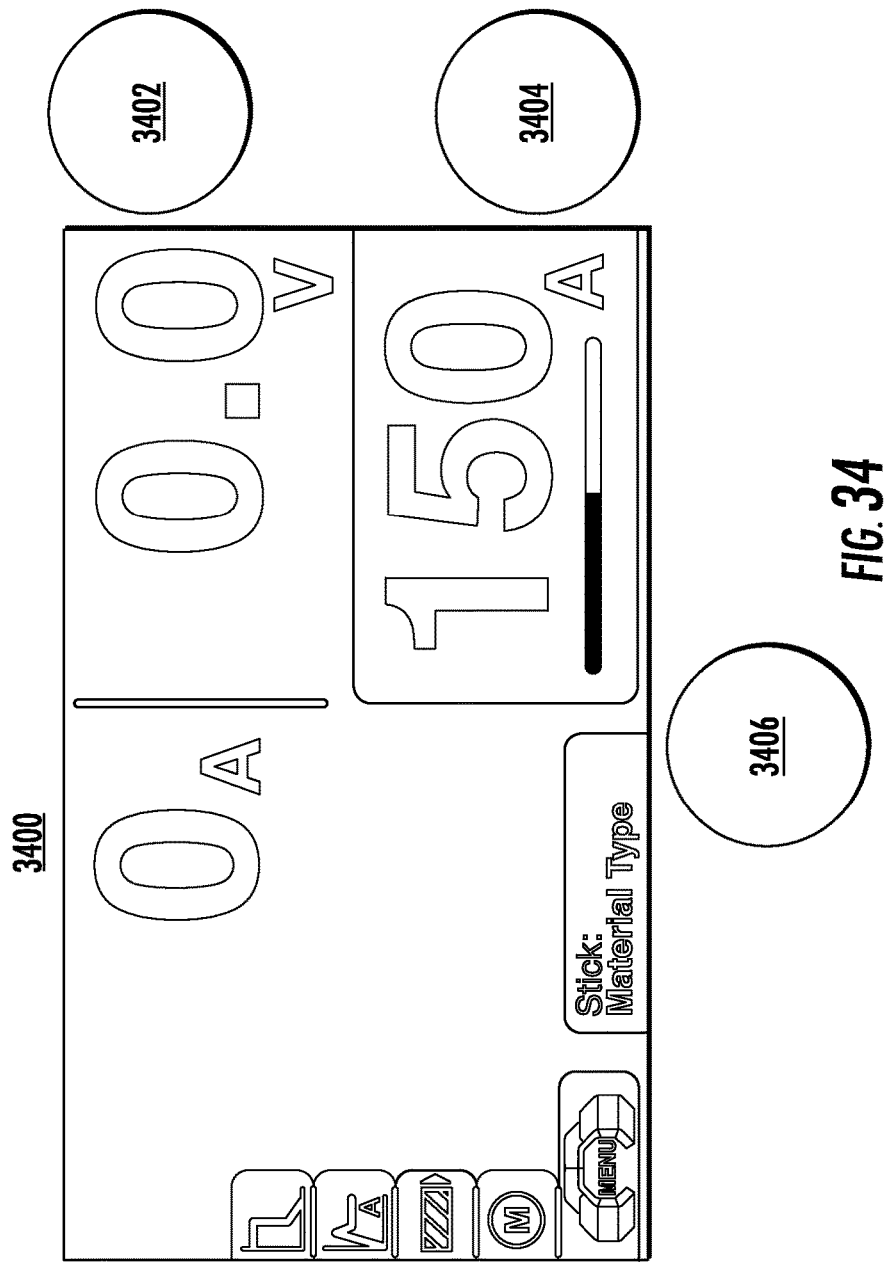
Figure 35:
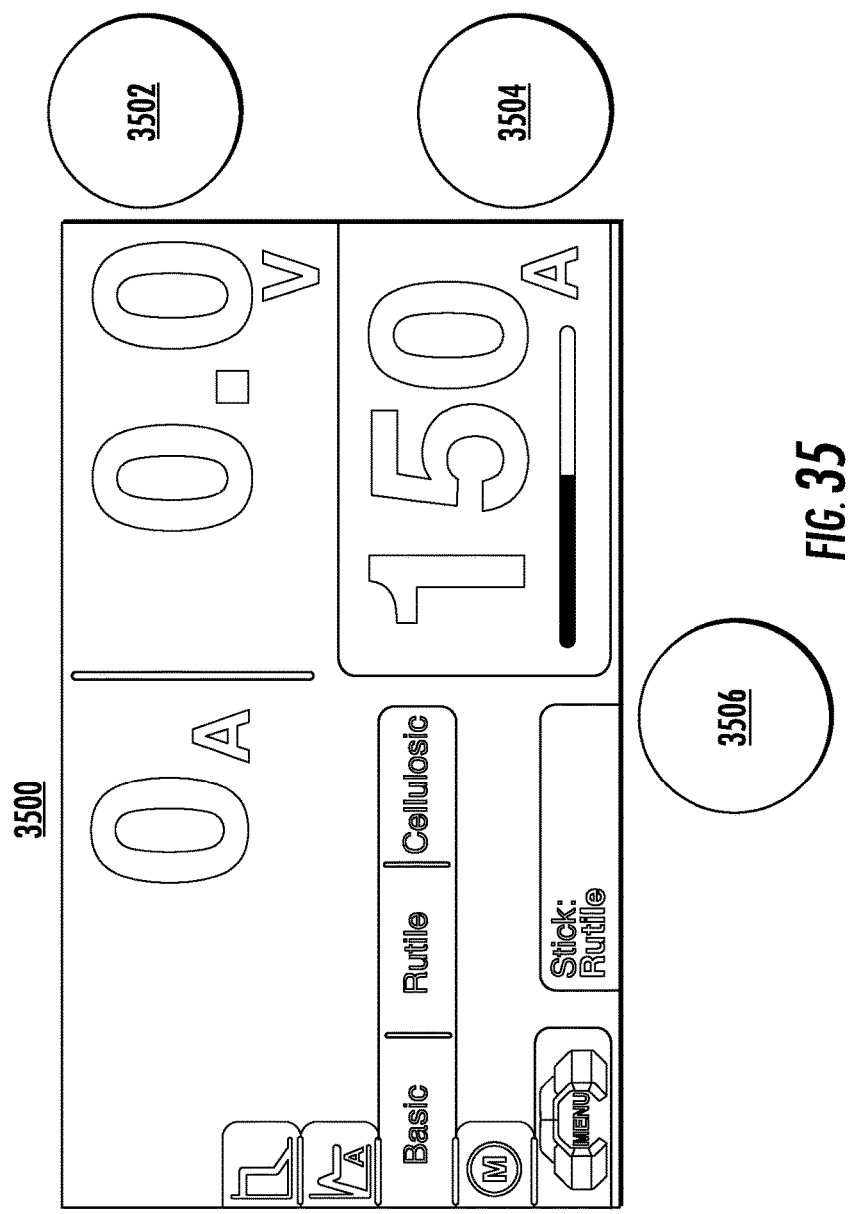

Referring now to FIGS. 30-35, a set of additional popup menus may be available in stick/MMA mode. FIGS. 30 and 31 illustrate an arc force popup menu. FIGS. 32 and 33 illustrate a hot start popup menu. Highlighting, selection, and adjustment of these popup menus works in a manner similar to that as other popup menus discussed above. FIGS. 34 and 35 illustrate a material type popup menu. While specific settings and parameters have been illustrated with respect to popup menus throughout the disclosure, it will be appreciated that popup menus may be used for any welding parameters for a given implementation.

Figure 36:
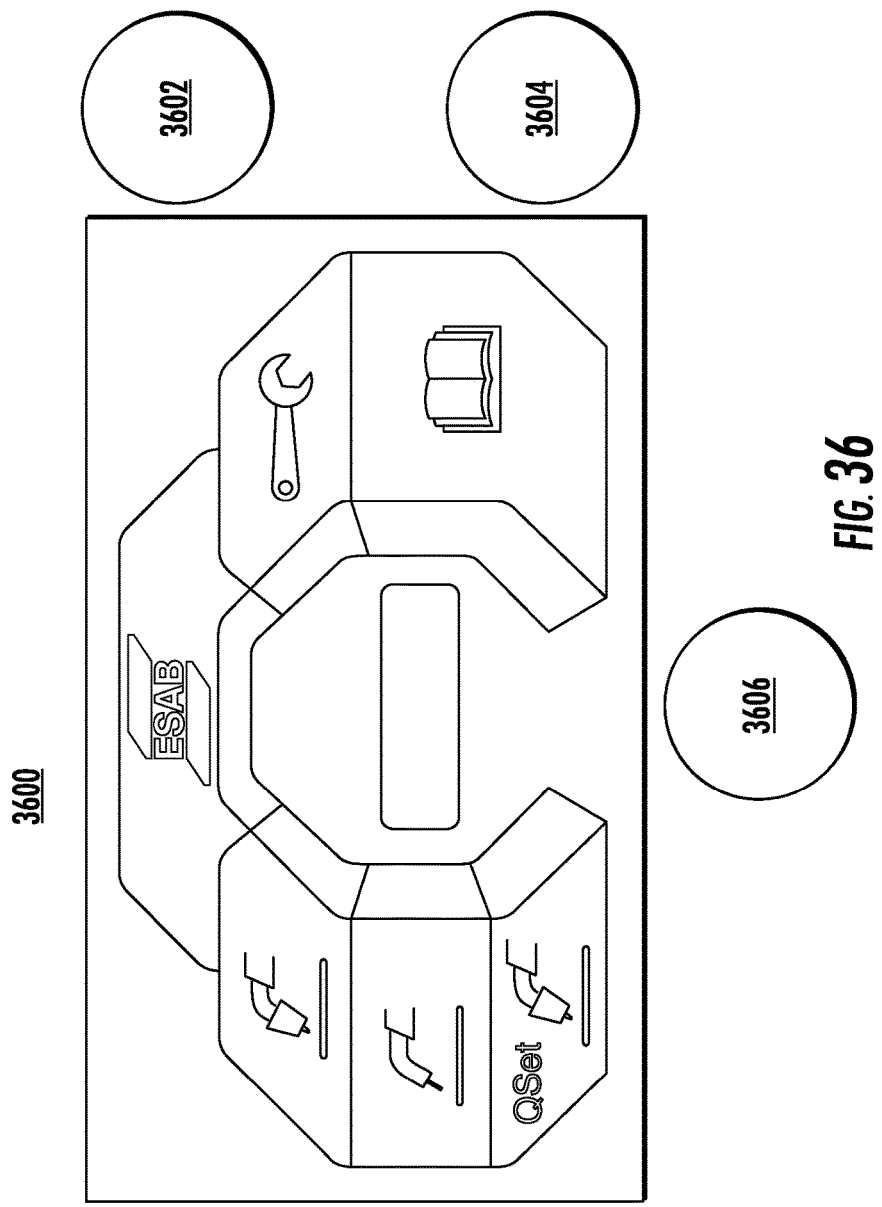
Figure 37:
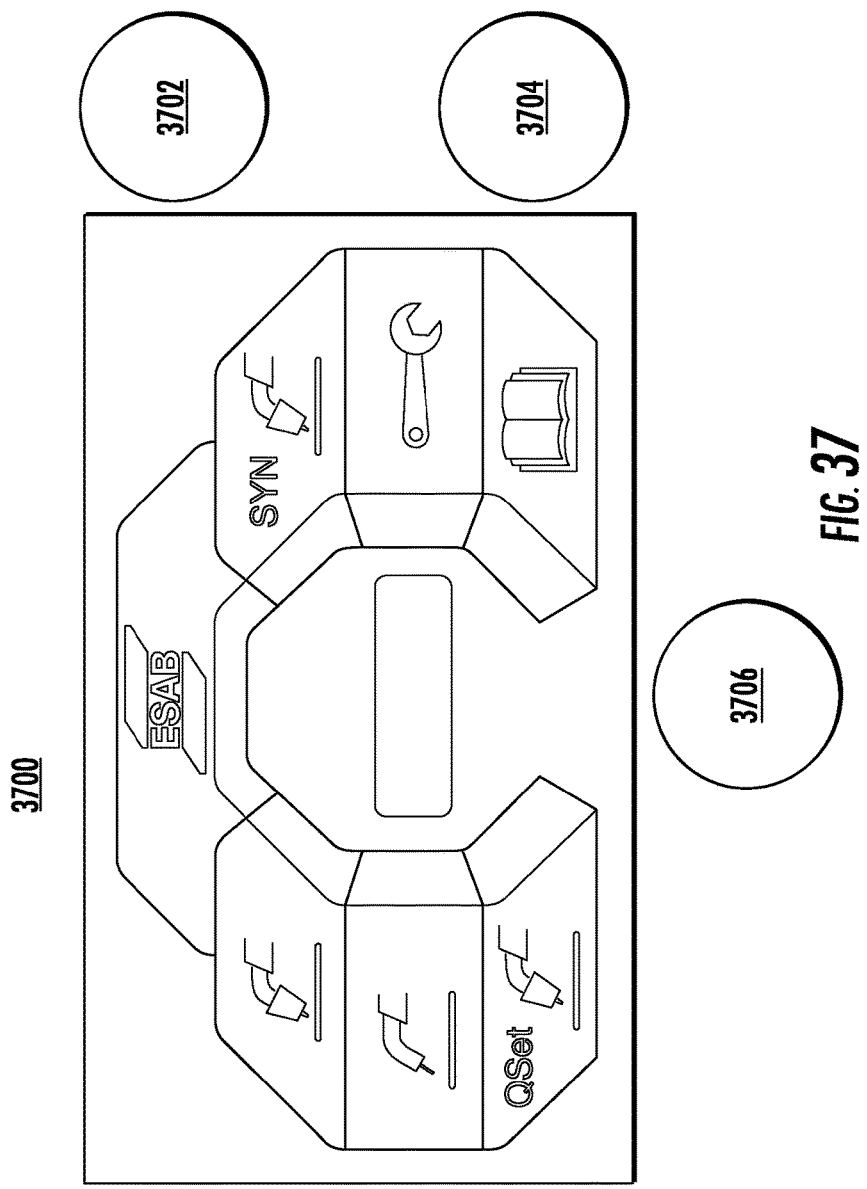
Figure 38:
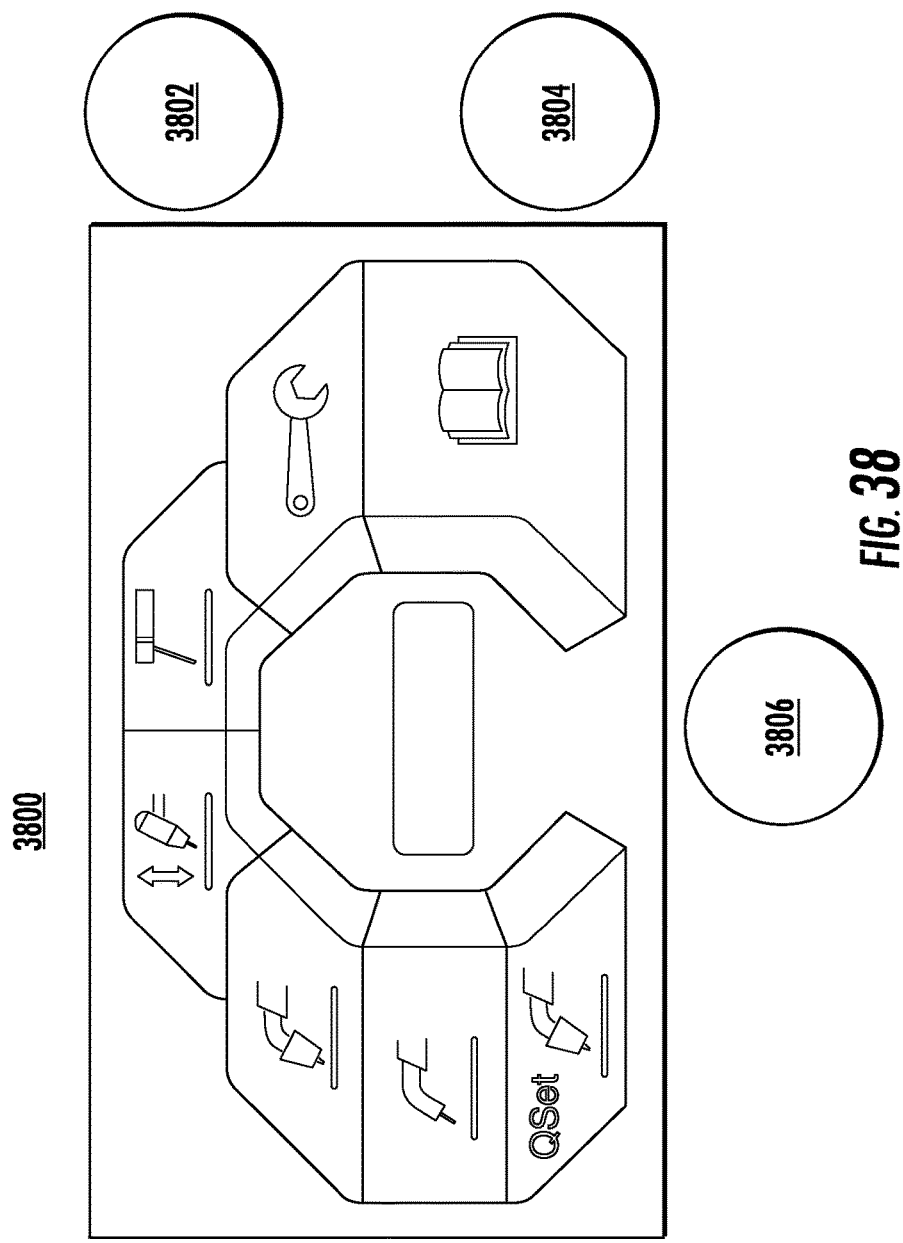
Figure 39:
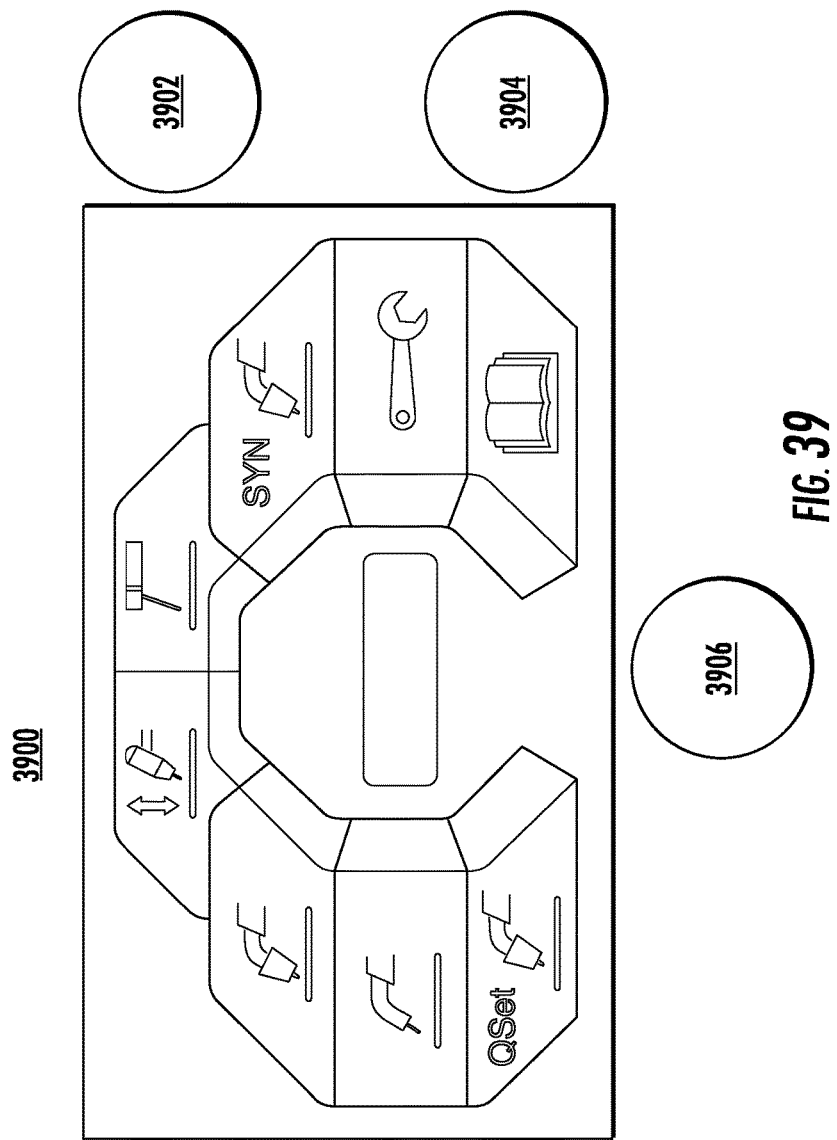
Figure 40:
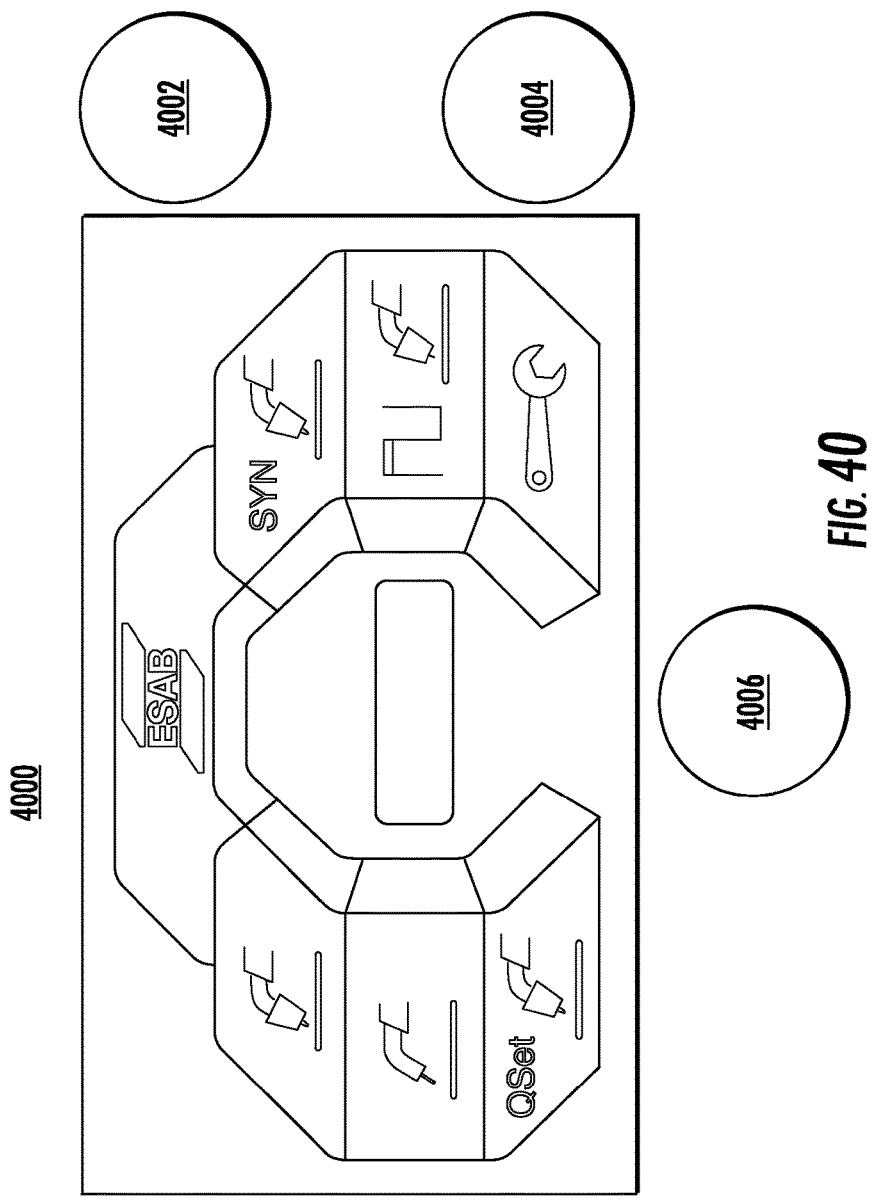
Figure 41:
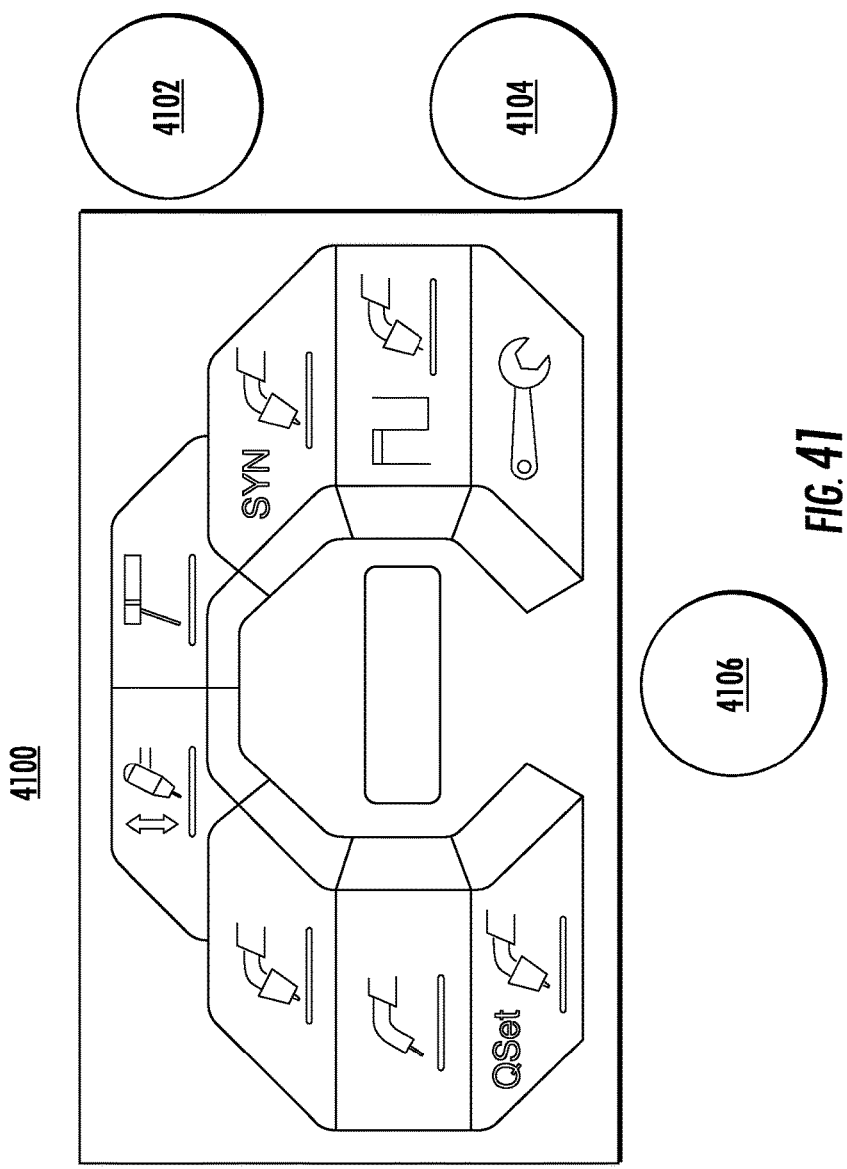

FIGS. 36-41 illustrate exemplary user interfaces for various process modes of a portable welding device. The user interfaces shown in FIGS. 36-41 provide examples of various user interface element and section layouts. For example, FIGS. 36 and 37 show only two sections in the user interface, and FIGS. 38 and 39 show multi-process user interfaces with three sections. While a limited number of layouts are shown, it will be appreciated that any combination of layouts may be used based upon a particular design or implementation.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 42:
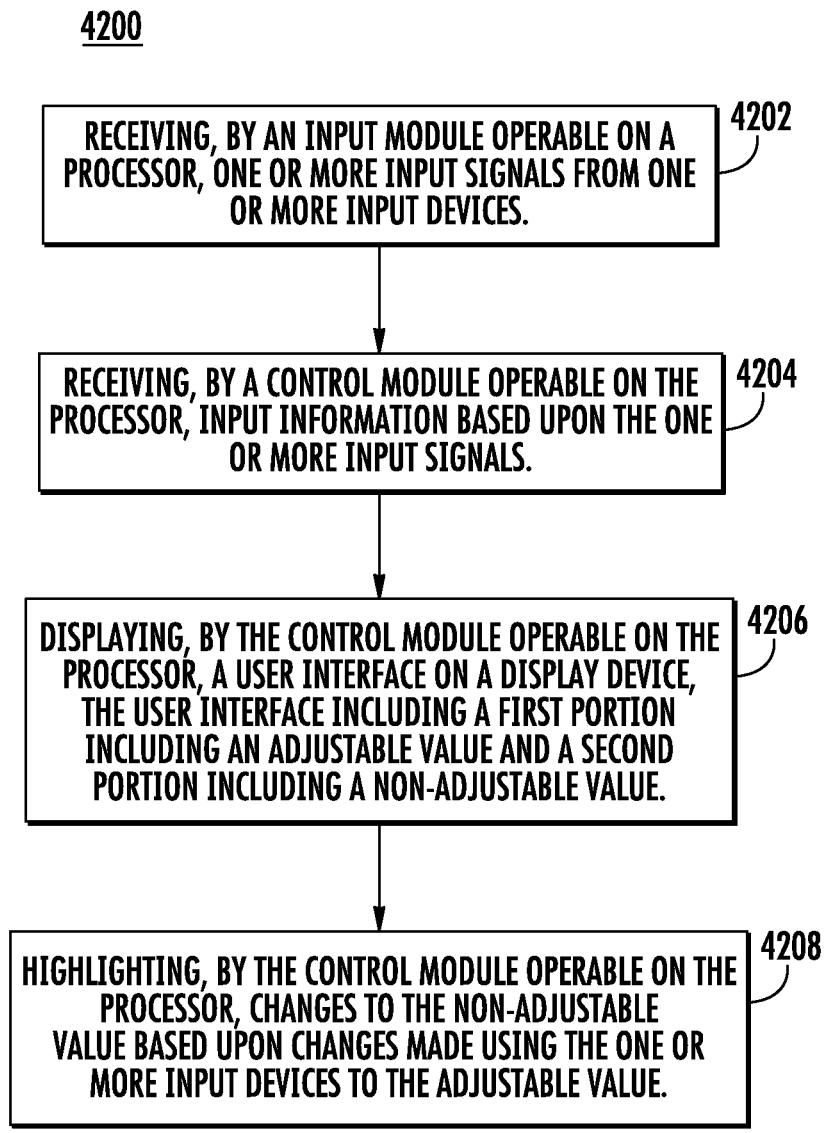
FIG. 42 illustrates a logic flow according to an embodiment.

FIG. 42 illustrates an embodiment of logic flow 4200. The logic flow 4200 may be representative of some or all of the operations executed by one or more embodiments described herein. At 4202, an input signal receiver, operable on a processor, may be configured to receive one or more input signals from one or more input devices, such as rotatable knobs that are configured to be pressed like a button.

At 4204, a control module, operable on the processor, may be configured to receive input information based upon the one or more input signals. Input information may be instructions derived from the one or more input signals by the input signal receiver, or may include the one or more input signals themselves, to be interpreted by the control module.

At 4206, a display device may be configured to display a user interface provided by the control module. The user interface may include a first portion including an adjustable value and a second portion including a non-adjustable value. For example, with reference to FIGS. 18 and 19 discussed above, an adjustable value may include IPM and a non-adjustable value may include plate thickness, which may be automatically derived based upon user adjustments using one or more input devices to the IPM value.

At 4208, the control module may be configured to highlight changes to the non-adjustable value, based upon changes made using the one or more input devices, to the adjustable value. Referring again to FIGS. 18 and 19, highlighting a slider bar in red (or any other color or texture) for the IPM value during adjustment may correspond to highlighting plate thickness in a common color, which may indicate to a user that changes made to an adjustable value, such as IPM, may have an impact on other, non-adjustable values, such as plate thickness, also displayed within the user interface.

Figure 43:
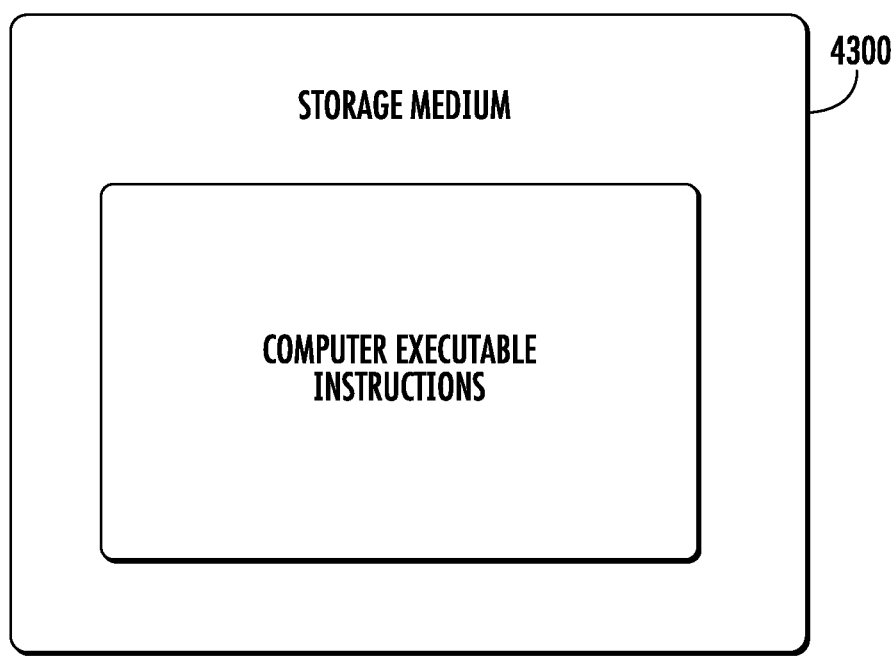
FIG. 43 illustrates a computer-readable storage medium according to an embodiment.

FIG. 43 illustrates an embodiment of a storage medium 4300. Storage medium 4300 may comprise any non-transitory computer-readable storage medium or machine-readable storage medium, such as an optical, magnetic or semiconductor storage medium. In various embodiments, storage medium 4300 may comprise an article of manufacture. In some embodiments, storage medium 4300 may store computer-executable instructions, such as computer-executable instructions to implement the logic flows described herein. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 44:
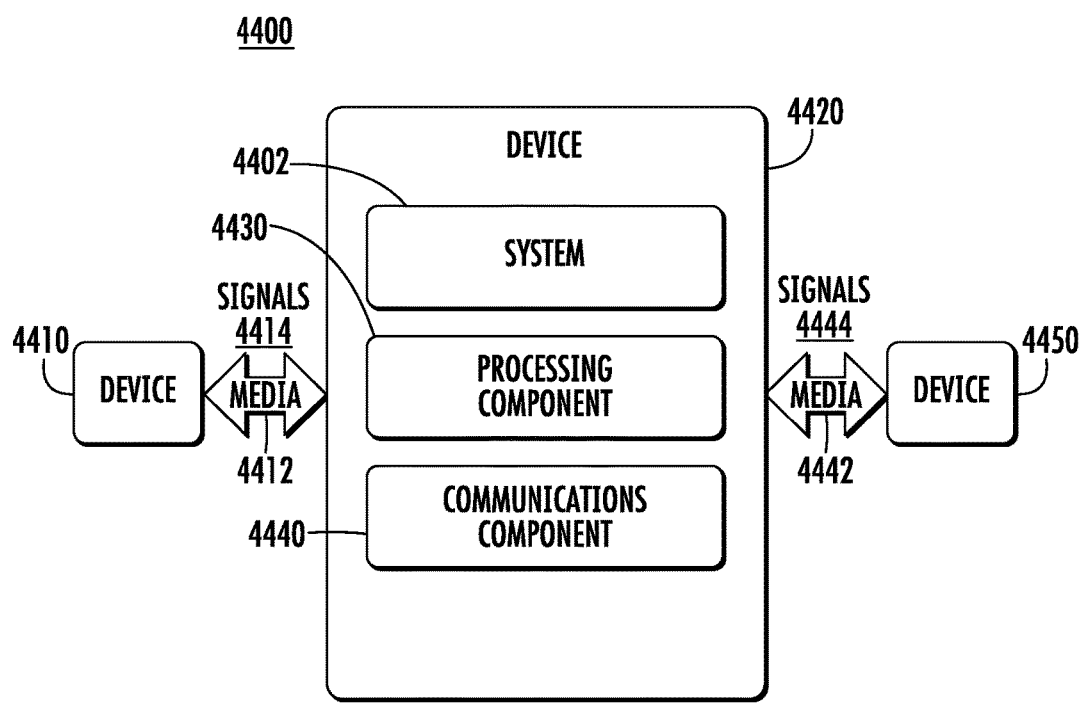
FIG. 44 illustrates a centralized system according to an embodiment.

FIG. 44 illustrates a block diagram of a centralized system 4400. The centralized system 4400 may implement some or all of the structure and/or operations for the disclosed embodiments in a single computing entity, such as entirely within a single device 4420. The device 4420 may be implemented within a welding system, for example, and operable to interact with a user with one or more of the user interfaces described herein.

The device 4420 may comprise any electronic device capable of receiving, processing, and sending information for the disclosed embodiments. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 4420 may execute processing operations or logic for the disclosed embodiments using a processing component 4430. The processing component 4430 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 4420 may execute communications operations or logic for the disclosed embodiments using communications component 4440. The communications component 4440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 4412, 4442 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 4420 may communicate with other devices 4410, 4450 over a communications media 4412, 4442, respectively, using communications signals 4414, 4444, respectively, via the communications component 4440. The devices 4410, 4450 may be internal or external to the device 4420 as desired for a given implementation.

Figure 45:
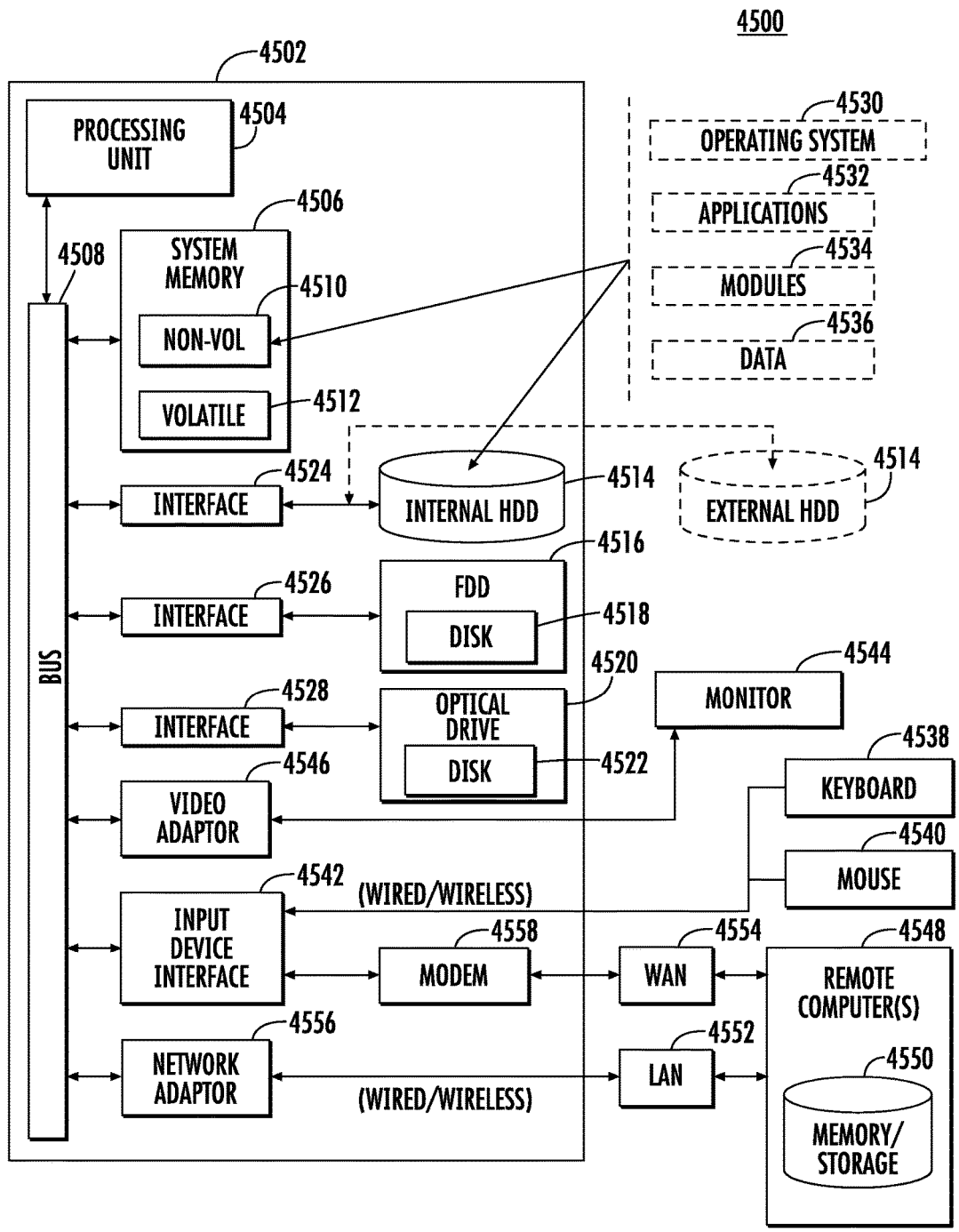
FIG. 45 illustrates a computing architecture according to an embodiment.

FIG. 45 illustrates an embodiment of an exemplary computing architecture 4500 suitable for implementing various embodiments as previously described. In various embodiments, the computing architecture 4500 may comprise or be implemented as part of an electronic device, such as a portable welding system, which may include some or all of the components illustrated within FIG. 45. In some embodiments, the computing architecture 4500 may be used, for example, to implement the systems, logic flows, and articles described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 4500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 4500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 4500.

As shown in FIG. 45, the computing architecture 4500 comprises a processing unit 4504, a system memory 4506 and a system bus 4508. The processing unit 4504 can be any of various commercially available processors, including without limitation an AMD®, Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 4504.

The system bus 4508 provides an interface for system components including, but not limited to, the system memory 4506 to the processing unit 4504. The system bus 4508 can be any of several types of bus structure that may further interconnect to a memory bus (with or without a memory controller), a peripheral bus, and a local bus using any of a variety of commercially available bus architectures. Interface adapters may connect to the system bus 4508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 4506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 45, the system memory 4506 can include non-volatile memory 4510 and/or volatile memory 4512. A basic input/output system (BIOS) can be stored in the non-volatile memory 4510.

The computer 4502 may include various types of computer-readable storage media in the form of one or more lower speed memory units, including an internal (or external) hard disk drive (HDD) 4514, a magnetic floppy disk drive (FDD) 4516 to read from or write to a removable magnetic disk 4518, and an optical disk drive 4520 to read from or write to a removable optical disk 4522 (e.g., a CD-ROM or DVD). The HDD 4514, FDD 4516 and optical disk drive 4520 can be connected to the system bus 4508 by a HDD interface 4524, an FDD interface 4526 and an optical drive interface 4528, respectively. The HDD interface 4524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 4510, 4512, including an operating system 4530, one or more application programs 4532, other program modules 4534, and program data 4536. In one embodiment, the one or more application programs 4532, other program modules 4534, and program data 4536 can include, for example, the various applications and/or components of the described systems.

A user can enter commands and information into the computer 4502 through one or more wire/wireless input devices, for example, a keyboard 4538 and a pointing device, such as a mouse 4540. Other input devices may include knobs, microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 4504 through an input device interface 4542 that is coupled to the system bus 4508, but can be connected by other interfaces such as a parallel port, IEEE 1394 serial port, a game port, a USB port, an IR interface, and so forth.

A monitor 4544 or other type of display device is also connected to the system bus 1108 via an interface, such as a video adaptor 4546. The monitor 4544 may be internal or external to the computer 4502. In addition to the monitor 4544, a computer typically includes other peripheral output devices, such as speakers, printers, and so forth.

The computer 4502 may operate in a networked environment using logical connections via wire and/or wireless communications to one or more remote computers, such as a remote computer 4548. The remote computer 4548 can be a workstation, a server computer, a router, a personal computer, portable computer, microprocessor-based entertainment appliance, a peer device or other common network node, and typically includes many or all of the elements described relative to the computer 4502, although, for purposes of brevity, only a memory/storage device 4550 is illustrated. The logical connections depicted include wire/wireless connectivity to a local area network (LAN) 4552 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 4502 is connected to the LAN 4552 through a wire and/or wireless communication network interface or adaptor 4556. The adaptor 4556 can facilitate wire and/or wireless communications to the LAN 4552, which may also include a wireless access point disposed thereon for communicating with the wireless functionality of the adaptor 4556.

When used in a WAN networking environment, the computer 4502 can include a modem 4558, or is connected to a communications server on the WAN 4554, or has other means for establishing communications over the WAN 4554, such as by way of the Internet. The modem 4558, which can be internal or external and a wire and/or wireless device, connects to the system bus 4508 via the input device interface 4542. In a networked environment, program modules depicted relative to the computer 4502, or portions thereof, can be stored in the remote memory/storage device 4550. It will be appreciated that the network connections shown are exemplary and other means of establishing a communications link between the computers can be used.

The computer 4502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Based on the foregoing information, it will be readily understood by those persons skilled in the art that the disclosure is susceptible of broad utility and application. Many embodiments and adaptations of the disclosure other than those specifically described herein, as well as many variations, modifications, and equivalent arrangements, will be apparent from or reasonably suggested by the present disclosure and the foregoing descriptions thereof, without departing from the substance or scope of the present disclosure. Accordingly, while the disclosure has been described herein in detail in relation to its preferred embodiment, it is to be understood that this disclosure is only illustrative and exemplary of the present disclosure and is made merely for the purpose of providing a full and enabling disclosure of the disclosure. The foregoing disclosure is not intended to be construed to limit the disclosure or otherwise exclude any such other embodiments, adaptations, variations, modifications or equivalent arrangements; the disclosure being limited only by the claims appended hereto and the equivalents thereof. Although specific terms are employed herein, they are used in a generic and descriptive sense only and not for the purpose of limitation.

What is claimed is:

1. A portable welding system, comprising:
    a processor operable with a memory and a display device;
    one or more input devices;
    an input signal receiver operable on the processor to receive one or more input signals from the one or more input devices; and
    a display controller operable on the processor to receive input information from the input signal receiver and to retrieve user interface information from the memory based upon the input information for the display of a user interface on the display device, the user interface including a first portion including an adjustable value of a welding parameter and a second portion including a non-adjustable value, the display controller operable to visually highlight changes to the non-adjustable value based upon changes made using the one or more input devices to the adjustable value, wherein the display controller is further configured to display a measurement value of the adjustable value at the second portion to replace the non-adjustable value.

2. The portable welding system of claim 1, wherein the one or more input devices include rotatable knobs.

3. The portable welding system of claim 1, wherein the display controller is configured to visually highlight changes using a common visual feature.

4. The portable welding system of claim 1, wherein the adjustable value is inches per minute (IPM) and the non-adjustable value is plate thickness.

5. The portable welding system of claim 1, wherein the user interface includes a number of on-screen user interface elements selectable by the one or more input devices.

6. The portable welding system of claim 5, wherein the on-screen user interface elements have a diminished contrast value when one or more of the on-screen user interface elements is not adjustable, and wherein the on-screen user interface elements have an increased contrast value when one or more of the on-screen user interface elements is adjustable.

7. A computer-implemented method for controlling a user interface of a portable welding system, comprising:
    receiving, by an input signal receiver operable on a processor, one or more input signals from one or more input devices;
    receiving, by a display controller operable on the processor, input information based upon the one or more input signals;
    displaying, by the display controller operable on the processor, a user interface on a display device, the user interface including a first portion including an adjustable value and a second portion including a non-adjustable value;
    highlighting, by the display controller operable on the processor, changes to the non-adjustable value based upon changes made using the one or more input devices to the adjustable value; and
    displaying, by the display controller operable on the processor, a measurement value of the adjustable value at the second portion to replace the non-adjustable value.

8. The computer-implemented method of claim 7, wherein the one or more input devices include rotatable knobs.

9. The computer-implemented method of claim 7, wherein the display controller is configured to highlight the changes using a common visual feature.

10. The computer-implemented method of claim 7, wherein the adjustable value is inches per minute (IPM) and the non-adjustable value is plate thickness.

11. The computer-implemented method of claim 7, wherein the user interface includes a number of on-screen user interface elements selectable by the one or more input devices.

12. The computer-implemented method of claim 11, wherein the on-screen user interface elements have a diminished contrast value when one or more of the on-screen user interface elements is not adjustable, and wherein the on-screen user interface elements have an increased contrast value when one or more of the on-screen user interface elements is adjustable.

13. An article comprising a non-transitory computer-readable storage medium including instructions that, when executed by a processor, enable a portable welding system to:

receive, by an input signal receiver operable on a processor, one or more input signals from one or more input devices;

receive, by a display controller operable on the processor, input information based upon the one or more input signals;

display, by the display controller operable on the processor, a user interface on a display device, the user interface including a first portion including an adjustable value and a second portion including a non-adjustable value;

highlight, by the display controller operable on the processor, changes to the non-adjustable value based upon changes made using the one or more input devices to the adjustable value; and display, by the display controller operable on the processor, a measurement value of the adjustable value at the second portion to replace the non-adjustable value.

14. The article of claim 13, wherein the one or more input devices include rotatable knobs.

15. The article of claim 13, wherein the display controller is configured to highlight the changes using a common visual feature.

16. The article of claim 13, wherein the adjustable value is inches per minute (IPM) and the non-adjustable value is plate thickness.

17. The article of claim 13, wherein the user interface includes a number of on-screen user interface elements selectable by the one or more input devices.

18. The article of claim 17, wherein the on-screen user interface elements have a diminished contrast value when one or more of the on-screen user interface elements is not adjustable, and wherein the on-screen user interface elements have an increased contrast value when one or more of the on-screen user interface elements is adjustable.

* * * * *